(12) United States Patent
Di Florio et al.

(10) Patent No.: US 12,365,572 B2
(45) Date of Patent: Jul. 22, 2025

(54) ELEVATING NACELLE SUITABLE FOR INDOOR AND ALL-TERRAIN OUTDOOR USE

(71) Applicant: HAULOTTE GROUP, Lorette (FR)

(72) Inventors: Laurent Di Florio, Givors (FR); Jean-Baptiste Doray, Chasse-sur-Rhône (FR); Christian Devaux, Saint-Etienne (FR)

(73) Assignee: HAULOTTE GROUP, Lorette (FR)

( * ) Notice: Subject to any disclaimer, the term of this patent is extended or adjusted under 35 U.S.C. 154(b) by 913 days.

(21) Appl. No.: 17/426,249

(22) PCT Filed: Jan. 29, 2020

(86) PCT No.: PCT/EP2020/052094
§ 371 (c)(1),
(2) Date: Jul. 28, 2021

(87) PCT Pub. No.: WO2020/157094
PCT Pub. Date: Aug. 6, 2020

(65) Prior Publication Data
US 2022/0098017 A1 Mar. 31, 2022

(30) Foreign Application Priority Data
Jan. 29, 2019 (FR) .......................................... 1900809
Oct. 25, 2019 (FR) .......................................... 1911996

(51) Int. Cl.
*B66F 11/04* (2006.01)
*B60K 1/02* (2006.01)
(Continued)

(52) U.S. Cl.
CPC .............. *B66F 11/042* (2013.01); *B60K 1/02* (2013.01); *B60L 50/60* (2019.02); *B60L 53/50* (2019.02); *B60L 53/62* (2019.02); *B60L 2200/40* (2013.01)

(58) Field of Classification Search
CPC ...... B66F 11/042; B66F 9/24; B66F 9/07513; B66F 9/07536; B66F 11/04; B66F 13/00;
(Continued)

(56) References Cited

U.S. PATENT DOCUMENTS 6,065,565 A * 5/2000 Puszkiewicz ......... B66F 11/042
                                                182/148
9,428,173 B2 * 8/2016 Stefanon ................. B60L 58/15
(Continued)

FOREIGN PATENT DOCUMENTS

DE           10003271 A1     8/2001

OTHER PUBLICATIONS

Winco Generators 2018 Catalog (Year: 2018).*

*Primary Examiner* — Jessica L Laux
(74) *Attorney, Agent, or Firm* — 24IP Law Group USA, PLLC; Timothy R. DeWitt

(57) ABSTRACT

An all-terrain outdoor elevating nacelle comprising a mechanism for lifting a working platform, this mechanism being mounted on a chassis provided with a front bridge and a rear bridge that are provided with wheels. The motive power for moving the elevating nacelle on the ground is provided by a first electric motor and that for actuating the lifting mechanism is provided by a second electric motor via a hydraulic pump which it drives. The motors are supplied by a battery that can be recharged by one or more single-phase chargers on board the elevating nacelle from a single-phase or three-phase electrical network, a slot being further provided for mounting a power supply unit intended to be (Continued)

connected to the charger(s) to recharge the battery. The elevating nacelle is more environmentally friendly and quieter.

20 Claims, 12 Drawing Sheets

(51) Int. Cl.
  *B60L 50/60* (2019.01)
  *B60L 53/50* (2019.01)
  *B60L 53/62* (2019.01)
(58) Field of Classification Search
  CPC .......... B60K 1/02; B60K 6/46; B60K 7/0007; B60L 50/60; B60L 53/50; B60L 53/62; B60L 2200/40; B60L 50/15; B60L 50/61; Y02T 10/7072; Y02T 90/12; Y02T 10/62; Y02T 10/70; B60R 16/02; H02J 7/0013; H02J 7/0063; H02J 7/0068; H02J 7/1423; H02J 7/32
  See application file for complete search history.

(56) References Cited

U.S. PATENT DOCUMENTS

| | | | |
|---|---|---|---|
| 9,796,278 B2* | 10/2017 | Zaki | B60L 53/63 |
| 2010/0270961 A1* | 10/2010 | Schanzenbach | H02P 7/29 |
| | | | 388/811 |
| 2011/0198141 A1* | 8/2011 | Clark | B60K 17/356 |
| | | | 180/65.265 |
| 2020/0031643 A1 | 1/2020 | Iotti | |
| 2021/0002111 A1 | 1/2021 | Rushton et al. | |

* cited by examiner

ELEVATING NACELLE SUITABLE FOR INDOOR AND ALL-TERRAIN OUTDOOR USE

BACKGROUND OF THE INVENTION

Field of the Invention

The present invention concerns the field of mobile elevating work platforms (MEWP) also known as aerial work platforms (AWP). The invention relates in particular to an aerial work platform suitable for all-terrain outdoor use.

Brief Description of the Related Art

Aerial work platforms are machines intended to allow one or more people to work at a height. For this purpose, they include a working platform intended for one or more persons. The working platform is supported by a lifting structure that allows it to be raised from a lowered position on the frame of the aerial work platform to the desired working position at a height. The lifting mechanism is usually operated by a hydraulic system.

There are self-propelled aerial work platforms designed for all-terrain outdoor use. They operate on construction sites or other outdoor locations that often have no or limited access to a power supply network. For this reason, they are usually powered by an internal combustion engine and are equipped with a fuel tank to ensure acceptable working autonomy, refueling being possible, if necessary, on the site of the aerial work platform. The internal combustion engine drives one or more hydraulic pumps of the hydraulic system that operate the lifting mechanism of the work platform and supply power to a hydraulic motorization that drives the wheels of the aerial work platform for translation on the ground.

A disadvantage of this type of aerial work platform is the environmental and noise pollution caused respectively by the exhaust gases from the internal combustion engine and the noise from the engine itself.

Another disadvantage of this type of aerial work platforms is that they cannot be used inside buildings, precisely because of the exhaust gases and noise from the internal combustion engine.

By contrast, there are electric aerial work platforms developed specifically for use inside buildings. The driving force for the various movements is provided by electric motors powered by one or more rechargeable electric batteries. In particular, each wheel of the aerial work platform is equipped with an electric motor for ground travel and another electric motor is dedicated to the operation of a hydraulic pump of a hydraulic circuit used to operate the lifting mechanism of the working platform. As a result, these aerial work platforms are environmentally friendly and quiet. The aerial work platform is also equipped with a single-phase charger for recharging the battery(ies) by connecting to the single-phase mains supply. The battery-charging operation usually takes place overnight so that the aerial work platform can be used the next day with an autonomy corresponding to at least one working day.

But these electric aerial work platforms are not designed for all-terrain outdoor use. Indeed, they are not suitable for overcoming obstacles, particularly in view of their low ground clearance, the insufficient power of the electric motors driving the wheels and the positioning of these motors exposing them to shocks in an all-terrain environment. They are also not designed to provide sufficient stability outdoors, e.g., where the ground is not flat and level, due to the wheelbase and the lack of stabilizer feet. In addition, their autonomy is insufficient due to the fact that aerial work platforms intended for all-terrain outdoor use consume more energy, in particular because they require a more powerful motorization for obstacle overcoming and also have auxiliary devices such as stabilizing feet that need to be operated. This is all the more the case when there is no access to a power supply network at their place of work, or when access to it is limited and does not allow for sufficient recharging.

More generally, there is a technical prejudice according to which electric aerial work platforms, without an internal combustion engine, are not suitable for all-terrain outdoor use, mainly because of their insufficient working autonomy, taking into account, firstly, the size of the rechargeable electric batteries that can be installed on the aerial work platform and, secondly, their increased need for power, the variable environmental conditions, particularly in terms of temperature, which are unfavorable to electric batteries, as well as insufficient accessibility to a power supply network to recharge the batteries. This technical prejudice is further reinforced in the case of scissor lifts, which are often placed at a given point of use on a construction site over a long period of time exceeding one or more days. Moving the aerial work platform to recharge the batteries would mean repositioning the aerial work platform in the same place, which would mean wasting time and energy for users.

More recently, hybrid motorized aerial work platforms have been proposed, i.e., with an electric motor and an internal combustion engine. This type of aerial work platform can be used indoors with the electric motor and outdoors with the internal combustion engine. The two motors can be coupled in tandem to provide a power boost in certain circumstances. An example of such an aerial work platform is disclosed in EP 1 967 486 A1. But these hybrid-powered aerial work platforms also have the disadvantage of being a source of environmental and noise pollution related to the internal combustion engine.

SUMMARY OF INVENTION

In the context of the invention, one objective is to provide an aerial work platform which substantially limits the above-mentioned disadvantages. In particular, one objective is to propose an aerial work platform that can be used in all-terrain outdoors while significantly limiting environmental and noise pollution. To this end, according to a first aspect, it is proposed an aerial work platform suitable for all-terrain outdoor use, comprising:
  a frame equipped with at least two front wheels and at least two rear wheels allowing the translation of the aerial work platform along the ground,
  a working platform,
  a lifting mechanism for the working platform, which is mounted on the frame,
  at least one first electric motor for providing the driving power to move the aerial work platform along the ground,
  at least one second electric motor for providing the driving power to operate the lifting mechanism of the working platform,
  at least one rechargeable electric battery (20) for powering the at least one first and the at least one second electric motor,
  wherein:

the driving power for moving the aerial work platform along the ground is always provided exclusively by the at least one first electric motor, and the driving power for actuating the lifting mechanism of the work platform is always provided exclusively by the at least one second electric motor, the aerial work platform further comprises:

a front axle equipped with the two front wheels and a rear axle equipped with the two rear wheels, at least one of the axles being a transmission axle for transmitting the driving force of the at least one first electric motor to the corresponding wheels, at least one single-phase charger for recharging the at least one rechargeable electric battery by connection to a single-phase power supply network; and a location provided for the mounting, preferably in a removable manner, of a power generator intended to be connected to at least one of the chargers to recharge the battery.

This makes the aerial work platform more environmentally friendly and quiet, as it uses only electric motors to provide the driving force necessary for translating the aerial work platform along the ground and to operate the lifting mechanism. Therefore, the aerial work platform can be used not only outdoors, but also inside a building. In addition, electric motors are more energy efficient than internal combustion engines and do not present a risk of hydraulic fluid leakage as in the case of hydraulic motors. The fact that the wheels of the aerial work platform are mounted on a front axle and a rear axle makes it possible to adapt the aerial work platform to all-terrain outdoor use, given their robustness and reliability and the fact that the first electric motor(s) is (are) not placed at the level of the wheels, it being specified that the power supplied by the first electric motor(s) is appropriately chosen. If, in use, the autonomy of the battery(ies) should prove insufficient without the availability of a suitable electrical power network, a power generator can be mounted on the aerial work platform at the designated location to recharge the rechargeable battery(ies), thereby increasing the autonomy of use of the aerial work platform. More generally, its electrical and other components are advantageously chosen so as to reduce energy consumption, which can also be optimized by control electronics on board the aerial work platform. The invention has therefore overcome the technical prejudice that it is not possible to develop electric aerial work platforms without an internal combustion engine for outdoor use.

It is preferable that the mounting of the power generator on the aerial work platform be of a removable nature, the location of the aerial work platform intended to receive it being itself preferably arranged to facilitate the installation and removal thereof. Thus, the power generator can be mounted on or removed from the aerial work platform as required, in particular by the end user, for example on a building site, or by an aerial work platform rental company, for example according to the wishes of its customers. The removable mounting of the power generator on the aerial work platform has several advantages. It is thus possible to market the aerial work platform without the power generator if the user envisages exclusively a use for which the autonomy of its battery(ies) is sufficient, for example for use exclusively indoors or outdoors where an electrical network is permanently or almost permanently available. In addition, a power generator can always be added to the aerial work platform if it is later used in an environment without sufficient access to an external power supply. Moreover, this allows the use of the same power generator to be shared between several aerial work platforms designed to receive it in a removable manner. For example, a rental company can manage a fleet of aerial work platforms with a smaller number of power generators and make them available to its customers on demand as an accessory. Another advantage is that the regular maintenance of the power generator is independent of the aerial work platform, which remains operational during this time. Another advantage is that the power generator can also be removed from the aerial work platform and used for other purposes on a construction site.

According to a particularly advantageous embodiment, provision may be made for the possibility of equipping the aerial work platform with two or three single-phase chargers, thus providing flexibility in charging the rechargeable battery(ies) depending on whether a single-phase or multiphase, usually three-phase, electrical power source is available. Where a suitable single-phase power source is available, provision may be made to connect only one of the single-phase chargers. On the contrary, when a suitable multiphase, in particular three-phase, electrical power source is available, each of the single-phase chargers—if there are two or three—is preferably connected to a respective one of the phases, which allows a substantially faster charging of the battery(ies) than in the previous case. Moreover, this allows the aerial work platform to be equipped with either a single-phase or three-phase power generator. Furthermore, the use of at least two, preferably three, single-phase chargers rather than, for example, a single-phase charger and a separate three-phase charger is more economical and less cumbersome. Moreover, the use of three single-phase chargers for connection to either a single-phase or three-phase power source makes it possible to use standard commercial chargers and avoids the need to develop a specific charger adapted to receive either a single-phase or three-phase power supply.

More generally, depending on preferred embodiments, the aerial work platform comprises one or more of the following characteristics:

the aerial work platform comprises three locations each provided for receiving a respective single-phase charger, the aerial work platform being further provided to be able to connect each single-phase charger received in a location to a respective phase and to a neutral of a three-phase power supply network so as to be able to charge the at least one rechargeable electrical battery from the current of two or three phases of the three-phase power supply network;

a respective single-phase charger is received in two of the locations or in all three;

the aerial work platform comprises three single-phase chargers dimensioned so as to be able to charge the at least one rechargeable electric battery to 80% of its capacity in less than 3 hours when connected to a suitable three-phase power supply network;

the aerial work platform further comprises a hydraulic circuit for operating the lifting mechanism and comprising at least one hydraulic pump), wherein the at least one second electric motor serves to drive the at least one hydraulic pump;

the hydraulic circuit comprises a single hydraulic pump;

the at least one rechargeable electric battery), the at least one single-phase charger and if applicable the three locations for receiving the single-phase chargers are located on a first lateral side of the frame with respect to the lifting mechanism, and the at least one second electric motor, the at least one hydraulic pump and the location for mounting the power generator are located on a second lateral side with respect to the lifting mechanism, the second lateral side being on the other side of the frame with respect to the first lateral side;

the front axle and the rear axle each constitute a transmission axle for transmitting the driving force of the at least one first electric motor to the corresponding wheels;

the aerial work platform comprises a single first electric motor and/or a single second electric motor;

the at least one first electric motor and/or the at least one second electric motor are AC motors operating at a nominal voltage less than or equal to 70 VAC, more preferably less than or equal to 50 VAC, the aerial work platform comprising at least one inverter for supplying the at least one first and/or the at least one second electric motor from the at least one rechargeable electric battery;

the rated voltage of the at least one rechargeable electric battery is less than or equal to 100 VDC, more preferably less than or equal to 50 VCC;

the aerial work platform comprises a power generator capable of being removably mounted in the location provided to that effect, and means for electrically connecting the power generator to at least one of the single-phase chargers, the power generator preferably having a fuel tank, the volume of which makes it possible to charge the at least one rechargeable electric battery to at least 50% of its capacity;

the aerial work platform comprises on-board electronics provided for identifying the type of power generator and adapting the charging curve of the at least one rechargeable electric battery as a function of the identified type of power generator;

the aerial work platform comprises on-board electronics provided for automatically causing the power generator to start when the charge level of the at least one rechargeable electric battery falls below a predetermined threshold;

the aerial work platform comprises on-board electronics configured to limit the power peaks absorbed by the at least one first and the at least one second electric motor, and/or to limit the power delivered to the at least one first electric motor and to the at least one second electric motor as a function of at least one parameter of the at least one rechargeable electric battery such as an ageing state of the at least one rechargeable electric battery or the current temperature of the at least one rechargeable electric battery;

the aerial work platform further comprises a single-phase electrical outlet installed on the working platform, the aerial work platform being provided to supply the single-phase electrical outlet by one or more of the following possibilities:
  connection to a single-phase power supply network,
  supply by the at least one rechargeable electric battery via an inverter with which the aerial work platform is equipped, and
  supply by the power generator;

the aerial work platform further comprises a three-phase electrical outlet installed on the working platform, the aerial work platform being provided to supply the three-phase electrical outlet by connection to a three-phase electrical supply network or by the power generator;

the lifting mechanism of the working platform is of the scissor type.

In the context of the aerial work platform thus proposed and described above according to this first aspect, and more generally concerning electrically motorized aerial work platforms that can be equipped with a removable power generator, it is desirable to provide a solution allowing the power generator to be quickly and easily installed on the aerial work platform.

U.S. Pat. No. 6,012,544 discloses a solution for removably mounting a power generator on an aerial work platform. It consists of a support plate for the power generator, which is provided with two hooks allowing the support plate to be cantilevered to the frame by inserting the hooks into two corresponding slots of the frame. The disadvantage of such a solution is that the installation of the power generator on the frame is delicate since the hooks must be precisely aligned with the slots of the frame during the installation operation, and the power generator is generally heavy, more than 100 kg, and is usually moved by a forklift. In addition, there is a risk that the hooks will disengage from the frame slots, for example, when the aerial work platform is moving over uneven ground.

Thus, according to a second aspect, an aim of the present invention is thus to provide a solution for removably placing a generator on an aerial work platform that allows to alleviate at least partly the above-mentioned disadvantages.

For this purpose, the invention provides an aerial work platform, comprising:
  a working platform,
  a lifting mechanism for the working platform,
  at least one electric motor for providing the driving power to move the aerial work platform along the ground and/or to operate the lifting mechanism of the working platform, this operating being preferably effected through a hydraulic circuit including a hydraulic pump driven by the at least one electric motor,
  at least one rechargeable electric battery for powering the at least one electric motor,
  at least one charger for recharging the at least one rechargeable electric battery, and
  a receiving location for a power generator provided for the removable mounting of a power generator for supplying the at least one charger and/or the at least one electric motor,
wherein:
  the receiving location is open or can be opened on an outer side of the aerial work platform to allow the generator to be brought into the receiving location and to be removed therefrom in a bring-in/removal direction;
  the receiving location comprises a positioning structure for the power generator by shape cooperation with a complementary positioning structure of the power generator, which is able to correct, when the power generator is brought into the receiving location, both:
    a lack of centering of the power generator with respect to the receiving location in a horizontal direction perpendicular to the bring-in/removal direction, and
    an angular misalignment of the power generator in a horizontal plane with respect to the bring-in/removal direction;
  the receiving location comprises at least one stop for positioning the generator in the receiving location in the bring-in/removal direction; and
  removable securing means for holding the generator securely in the receiving location and releasing it so as to permit removal of the power generator from the receiving location.

Thanks to the positioning structure of the receiving location capable of cooperating as mentioned with the complementary structure of the generator, the positioning of the generator in the receiving location, in particular by means of a forklift, is made easier and faster.

According to preferred embodiments, the aerial work platform comprises one or more of the following characteristics:

the receiving location includes a retaining structure for the power generator by shape cooperation with a complementary retaining structure of the power generator to oppose the withdrawal of the power generator from the receiving location in the bring-in/removal direction;

the retaining structure for the power generator is a fixed structure of the receiving location which is arranged to be positioned under the power generator when placed in the receiving location and to cooperate with the complementary retaining structure of the power generator which is arranged under the power generator;

the positioning structure for the power generator is a fixed structure of the receiving location;

the receiving location comprises a lower support provided for resting the power generator thereon by its lower side when it is in place in the receiving location, the positioning structure and/or the retaining structure forming part of the lower support;

the positioning structure comprises at least one inclined plane or two inclined planes in opposite directions and offset from each other in the horizontal direction perpendicular to the bring-in/removal direction, the at least one inclined plane or the two inclined planes being provided to cooperate with the complementary positioning structure of the power generator;

the aerial work platform further comprises at least one cable feeder which feeds a data connection cable and/or a power connection cable to the receiving location, the data link cable being provided to connect on-board electronics of the aerial work platform to the power generator when it is in the receiving location and the power connection cable being provided to connect the power generator to the electrical power circuit of the aerial work platform;

the aerial work platform comprises on-board electronics provided to control the power generator;

the on-board electronics comprises a wireless communication module to enable remote control of the power generator via the on-board electronics when the power generator is placed in the receiving location, the on-board electronics being advantageously configured to enable remote starting and/or remote inhibiting of the power generator via the wireless communication module;

the receiving location comprises an exhaust gas conduit tube which is positioned adjacent to or contiguous with an exhaust outlet of the power generator when placed in the receiving location;

the aerial work platform comprises a system for locking the power generator in the receiving location for the purpose of protection against theft preferably by means of a padlock or a lock;

the aerial work platform comprises a frame with ground moving members, the receiving location being arranged on the frame or on a turret of the lifting mechanism of the working platform which turret is pivotally mounted on the frame;

the receiving location is arranged on the frame in a position adjacent to a wheel of the frame such that a portion of the power generator extends out of the frame above the wheel when the power generator is in the receiving location.

According to another aspect, the invention also provides a power generator adapted for use with the previously described aerial work platform, which power generator is adapted to be placed in the receiving location of the aerial work platform and comprising:

at least two fork passages for handling the power generator by means of a forklift; and a complementary positioning structure intended to cooperate with the positioning structure of the reception location of the aerial work platform, so as to correct, when the power generator is brought into the receiving location, both:

a lack of centering of the power generator with respect to the receiving location in a horizontal direction perpendicular to the bring-in/removal direction, and an angular misalignment of the power generator in a horizontal plane with respect to the bring-in/removal direction.

According to preferred embodiments, the invention comprises one or more of the following characteristics:

the power generator further comprises a complementary retaining structure intended to cooperate with the retaining structure of the receiving location of the aerial work platform so as to oppose the withdrawal of the power generator from the receiving location in the bring-in/removal direction;

the complementary positioning structure and/or the complementary retaining structure are fixed;

the power generator comprises a power socket for connecting the power generator to a power circuit of the aerial work platform and/or a data link connector for connecting control electronics of the power generator to on-board electronics of the aerial work platform;

the power generator is arranged to be controlled by on-board electronics of the aerial work platform;

the power generator is arranged to be controlled preferably exclusively by on-board electronics of the aerial work platform.

According to yet another aspect, the invention proposes a group comprising an aerial work platform as described above and a generator as just described.

It will be understood that the invention according to this second aspect can be applied in particular to an aerial work platform according to the first aspect described above.

BRIEF DESCRIPTION OF THE DRAWINGS

Other characteristics and advantages of the invention will appear on reading the following description of a preferred embodiment of the invention, given as an example and with reference to the appended drawing.

DETAILED DESCRIPTION OF THE INVENTION

Figure 1:
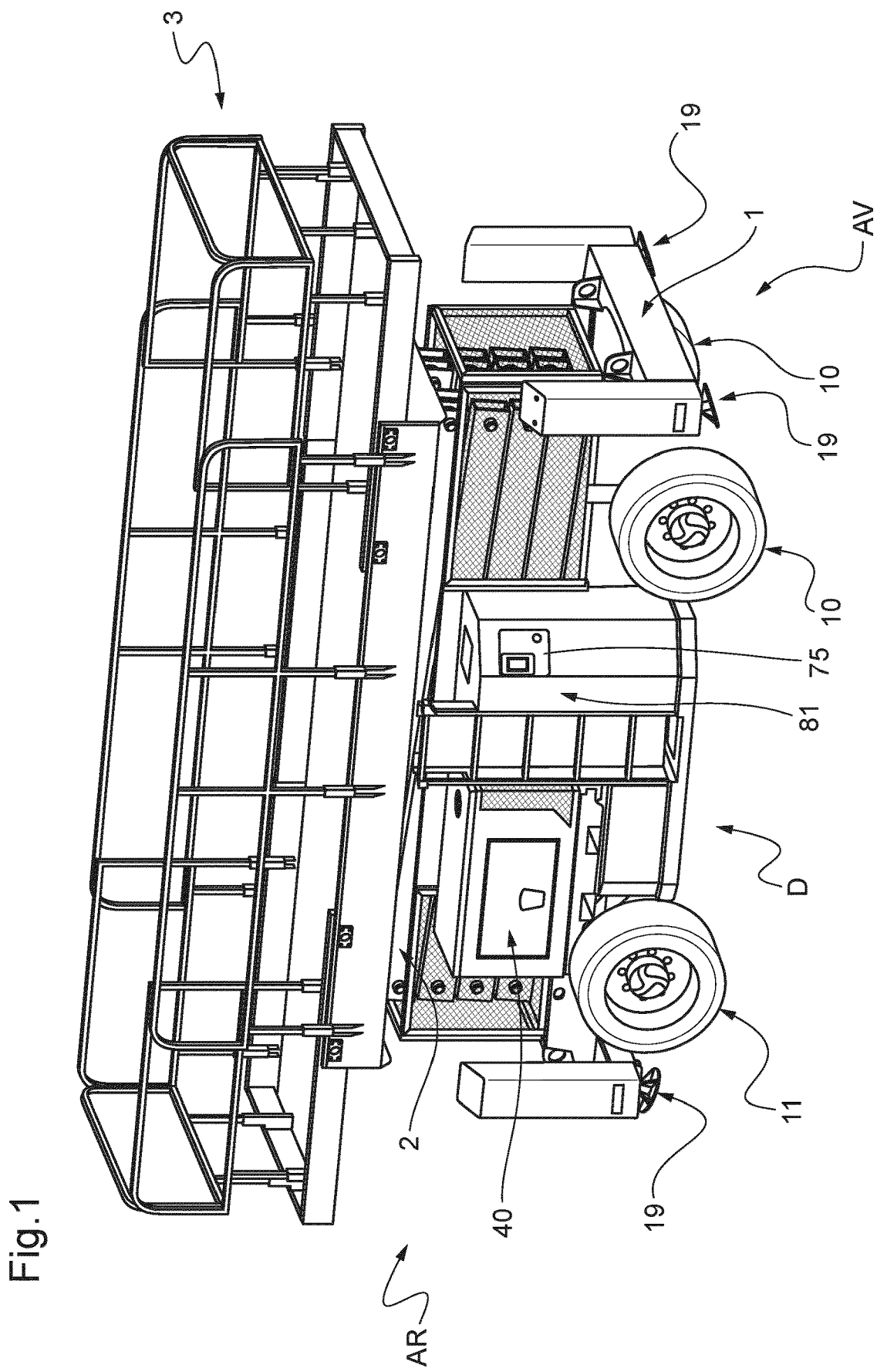
FIG. 1 represents a perspective view of an aerial work platform according to an embodiment of the invention seen from its right side, with the working platform in the lowered position.

The illustrated aerial work platform comprises a frame 1, a lifting mechanism 2 mounted on the frame 1 and a working platform 3 supported by the lifting mechanism 2. The working platform 3 typically comprises a floor and a guardrail and is designed to accommodate people on board, and possibly equipment.

The aerial work platform is of the scissor type. In other words, the lifting mechanism 2 is a scissor lifting mechanism: this type of lifting mechanism is known per se. It consists of beams hinged at their center in a scissor-like manner, these scissor mechanisms being mounted on top of each other by their ends which are pivotally connected so that they can fold and unfold in height. One or more hydraulic cylinders 4 are used to extend or retract the lifting mechanism 2 to raise the working platform 3 to the desired working height and lower it onto the frame 1.

The frame 1 is provided with at least two front wheels 10 and at least two rear wheels 11 by means of which the frame 1 rests on the ground and by means of which the aerial work platform can be moved along the ground. As can be seen from the figures, the front side of the aerial work platform is designated AV, the rear side is designated AR, the left side is designated G and the right side is designated D.

Figure 4:
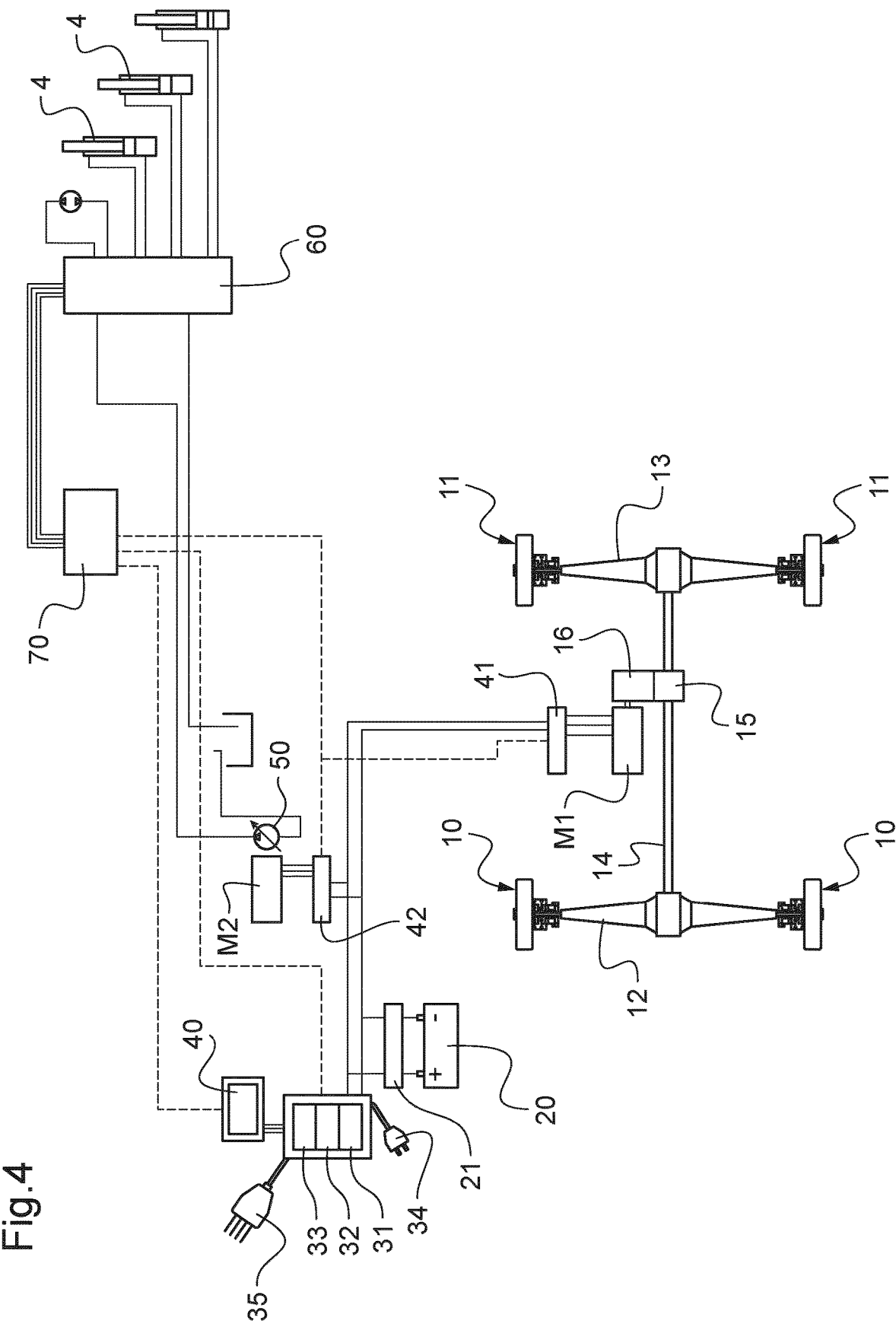
FIG. 4 is a synoptic diagram of the electrical and hydraulic circuits of the aerial work platform.

As can be seen in FIG. 4, the front wheels 10 are mounted on an axle of a front axle 12 and the rear wheels 11 are mounted on an axle of a rear axle 13. It is advantageous that all wheels 10, 11 be driven, and thus that the aerial work platform is equipped with an all-wheel drive. In other words, the front and rear axles 12, 13 are drive axles and both are connected to the same electric motor M1 for the purpose of driving the wheels of each. Classically, a speed reducer 16 may be provided through which the rotation of the output shaft of the electric motor M1 is transmitted to the front and rear axles 12, 13. Of course, a speed reduction can also be implemented at the differential of each axle 12, 13 and/or at the coupling of the wheels 10, 11. Preferably, each of the axles 12, 13 typically incorporates a differential allowing the corresponding wheels to rotate at different speeds. In this case, the motor M1 is mounted on one of the axles while its rotational movement is transmitted to the other axle by means of a transmission shaft 14 coupled at each of its ends by means of a respective universal joint 17. A central differential 15 is preferably provided to distribute the forces between the front and rear axles and to allow for differences in driving speed between the two axles.

In this case, the front wheels 10 are steered, but alternatively it can be the rear wheels 11. In another embodiment, all four wheels 10, 11 are steered.

The use of four-wheel drive is particularly suitable for all-terrain outdoor use of the aerial work platform, especially for obstacle clearance. In addition, the use of an all-wheel drive is economical since only one electric motor is required to drive the front and rear wheels. In addition, the front and rear axles 12, 13, the electric motor M1 and the drive shaft 14 and other associated components can be advantageously pre-assembled into a sub-assembly ready to be mounted on the frame 1, thus saving time during the assembly of the aerial work platform which is thereby simplified.

Alternatively, provision made be made for two electric motors M1, one dedicated to driving the front wheels 10 and the other dedicated to driving the rear wheels 11. In this case, each of these two motors can be mounted directly on the corresponding drive axle. However, it is more economical to use a single electric motor M1 to drive the wheels.

In another embodiment, the aerial work platform has only two drive wheels, either the front or the rear ones, with an electric motor M1 to drive them.

The electric motor M1 is preferably dedicated exclusively to driving the wheels. This is also the case if there are several electric motors M1 to drive the wheels.

Generally speaking, the fact that the aerial work platform is equipped with a front axle 12 and a rear axle 13 makes it suitable for all-terrain outdoor use, in particular by providing appropriate ground clearance without the location of the electric motor(s) being a nuisance. More generally, the mechanical design of the aerial work platform is suitable for all-terrain outdoor use, similar to existing aerial work platforms designed for such use, particularly in terms of wheelbase and mechanical strength.

FIG. 4 is a synoptic diagram of the electrical and hydraulic circuits of the aerial work platform. As illustrated, the aerial work platform includes a battery 20 for powering the various electrical components of the aerial work platform. Alternatively, the aerial work platform may comprise several batteries connected in series and/or in parallel, which variant is hereinafter referred to as a single battery 20. Preferably, the battery is provided to ensure that the aerial work platform has an operating autonomy of at least one normal working day.

The aerial work platform comprises at least a first single-phase charger 31 for recharging the battery 20 via a battery 20 management circuit 21. It is preferably provided to accept an AC voltage as input, corresponding to the single-phase mains voltage of the country in which the aerial work platform is used.

As a reminder, in Europe, the single-phase mains voltage is generally 230 VAC 50 Hz. For many countries in the world, it is in the range of 220 VAC to 240 VAC, usually at 50 Hz, sometimes 60 Hz. In many countries on the American continent and in further other countries, the single-phase mains voltage is 110 to 127 VAC, usually at 60 Hz, sometimes 50 Hz. In Japan, it is 100 VAC, 60 Hz or 50 Hz depending on the region.

Therefore, the charger 31 can advantageously be designed for a single-phase mains voltage range so as to be suitable for use in different countries, for example from 110 VAC to 230 VAC or even 100 VAC to 240 VAC.

The aerial work platform may comprise two further single-phase chargers 32, 33 provided, together with the first charger 31, to recharge the battery 20—via the battery 20 management circuit 21—from a three-phase mains supply.

To this end, the aerial work platform shall be equipped with a cable fitted with a standard plug 34 or a standard socket or any other suitable means for connecting one of the single-phase chargers 31 to 33 to a standard single-phase socket on the mains electricity network for the country concerned. It is equipped with a second cable with a standard plug 35 or a standard socket or any other suitable means to enable the aerial work platform to be connected to a standard three-phase socket of a three-phase electrical network.

This is advantageous when the maximum current delivered by a standard single-phase mains outlet is not compatible with a fast charge of the battery 20. This is typically the case for most single-phase 220 VAC or 230 VAC mains networks where a standard plug is designed to deliver a maximum of 16 A. A three-phase supply network allows for a substantially faster charging of the battery 20 than in the case of a single-phase supply network since the maximum power that can be supplied by the three phases simultaneously is greater than that of a single phase and the output power of the chargers 31 to 33 is added together.

From this point of view, each of the chargers 31, 32, 33 is preferably designed to accept at least a single-phase voltage of 220 VAC or 230 VAC as input. Thus, the battery 20 can be recharged either by connecting the first charger 31 to a single-phase mains supply at the corresponding voltage—or at another voltage which it may accept as input—or by connecting the three chargers 31, 32, 33 to a three-phase mains supply of 380 VAC or 400 VAC, each charger then being connected between a respective phase and the neutral so as to receive an input voltage of 220 VAC or 230 VAC.

The chargers 32, 33 can be designed for a single-phase voltage of 220 VAC or 230 VAC while the first charger 31 can be designed for a voltage range as mentioned above. Alternatively, the three chargers 31, 32, 33 are identical and provided for a voltage interval as mentioned in relation to the first charger 31.

It is advantageous for the chargers 31 to 33 to be able to charge together the battery 20 to 80% of its capacity in less than 3 hours, or even less than 2.5 hours, preferably in 2 hours, provided of course that the three-phase electrical supply network to which they are connected is capable of providing the required power. In comparison, charging the battery 20 to 80% of its capacity by a single-phase charger would then take about 6 to 8 hours. It is also possible to allow the battery 20 to be charged by only two phases by using or equipping the aerial work platform with only two of the three chargers 31 to 33. Preferably, the aerial work platform is designed to have three locations for mounting, respectively, one of the chargers 31, 32, 33. Thus, the same aerial work platform can be equipped with one to three chargers 31, 32, 33 as desired.

The on-board electronics 70 is preferably designed to adapt the charging curve of the battery 20 according to the possibilities of the mains electricity network of the country concerned and according to whether it is made from the single-phase or three-phase mains electricity network. For this purpose, provision made be made that the country is indicated to the on-board electronics 70 by the operator via the console 75. The aerial work platform is designed to detachably mount a power generator 40. The power generator 40 is intended to recharge the battery 20 in order to increase the operating range of the aerial work platform, particularly in the event that there is no access to a mains network or other source of electrical energy for the purpose of recharging the battery 20. More precisely, the battery 20 is charged via the three chargers 31 to 33 or one of them depending on whether the power generator 40 supplies a three-phase or single-phase current as output.

The aerial work platform is equipped with a hydraulic circuit supplying the hydraulic cylinders 4 used to operate the lifting mechanism 2. This hydraulic circuit comprises one hydraulic pump 50—alternatively several—which is driven by a second electric motor M2. It also comprises a hydraulic distributor 60 through which the various hydraulic actuators are supplied with hydraulic fluid, in particular the hydraulic cylinders 4. This also supplies other hydraulic actuators—not all shown—such as those used to control the orientation of the steerable wheels 10 and/or 11, to extend or retract four stabilizer legs 19 each arranged at a corner of the frame 2 and to release the brakes of the wheels 10, 11. Advantageously, provision may also be made for one or two hydraulic actuators—not shown—supplied by the hydraulic distributor 60 and used to selectively lock and release the differential of one or both of the front and rear axles 12, 13, in the event of slippage of the wheels 10 and/or 11.

Alternatively, provision may be made for several electric motors M2 driving one or more hydraulic pumps 50 of a common hydraulic circuit or of separate hydraulic circuits. However, it is more economical to use a single hydraulic pump 50 and a single electric motor M2 to drive it.

The electric motor(s) M2 are preferably dedicated exclusively to driving the hydraulic pump 50 or all the hydraulic pumps if there are several, of the hydraulic circuit(s).

The aerial work platform has no internal combustion engine, either to move the aerial work platform along the ground or to operate the lifting mechanism 2 or other hydraulic actuators. In fact, the driving power is always supplied to the hydraulic pump(s) by the electric motor(s) M2. In other words, the driving power to operate the lifting mechanism of the work platform is always provided exclusively by the M2 electric motor(s) (apart from the possible action of gravity, of course). The same is obviously true for the other hydraulic actuators mentioned above.

Similarly, the driving power to drive the wheels 10 and/or 11 as the case may be, and thus to move the aerial work platform along the ground, is always provided exclusively by the electric motor(s) M1 dedicated to this function (apart from the possible action of gravity, of course).

The electric motors M1 and M2 are advantageously AC motors, preferably three-phase, as these have a better efficiency compared to other types of motors. They are powered by the battery 20 via a respective inverter 41, 42 converting the DC voltage of the battery 20 into AC voltage.

The aerial work platform is also equipped with on-board electronics 70 comprising, for example, a computer, for controlling the hydraulic distributor 70, the chargers 31 to 33, as well as the electric motors M1 and M2 via their respective inverters 41, 42. The communication link between the control electronics 70 and these components, or at least the remote ones, may be via a bus such as a CAN data bus conforming to ISO 11898.

The on-board electronics 70 is preferably configured to optimally manage the electrical energy consumption of the various components, especially the electric motors M1, M2, in order to optimize the autonomy of the battery 20. In particular, it may advantageously be provided to limit the power peaks of the electric motors M1 and M2 by progressively supplying power to them, for example during a command to lift the working platform 3 or a command to move along the ground. The on-board electronics may also be configured to apply a power limitation setpoint to the inverters 41 and 42—or even to the inverter 22 mentioned below—as a function of the state of the battery 20, for example as a function of their ageing or their temperature.

The on-board electronics 70 may also be provided to identify the type of power generator 40 if mounted on the aerial work platform, in the case it is intended to be operable with different models of power generators, thereby enabling the on-board electronics 70 to adapt the load curve to the maximum power that the power generator can provide. Furthermore, the on-board electronics 70 may be designed to automatically cause the power generator 40 to be started when the charge level of the battery 20 falls below a predetermined threshold. Of course, provision may be made that the operator himself has the possibility to start the power generator 40.

For reasons of user safety, it is advantageous that all the electrical circuits of the aerial work platform—with the exception of the input of the chargers 31 to 33—operate at a voltage less than or equal to 50 V, and that therefore the nominal voltage of the electric motors is less than 50 VAC, as well as the voltage delivered by the battery 20 is less than or equal to 50 VDC.

Figure 5:
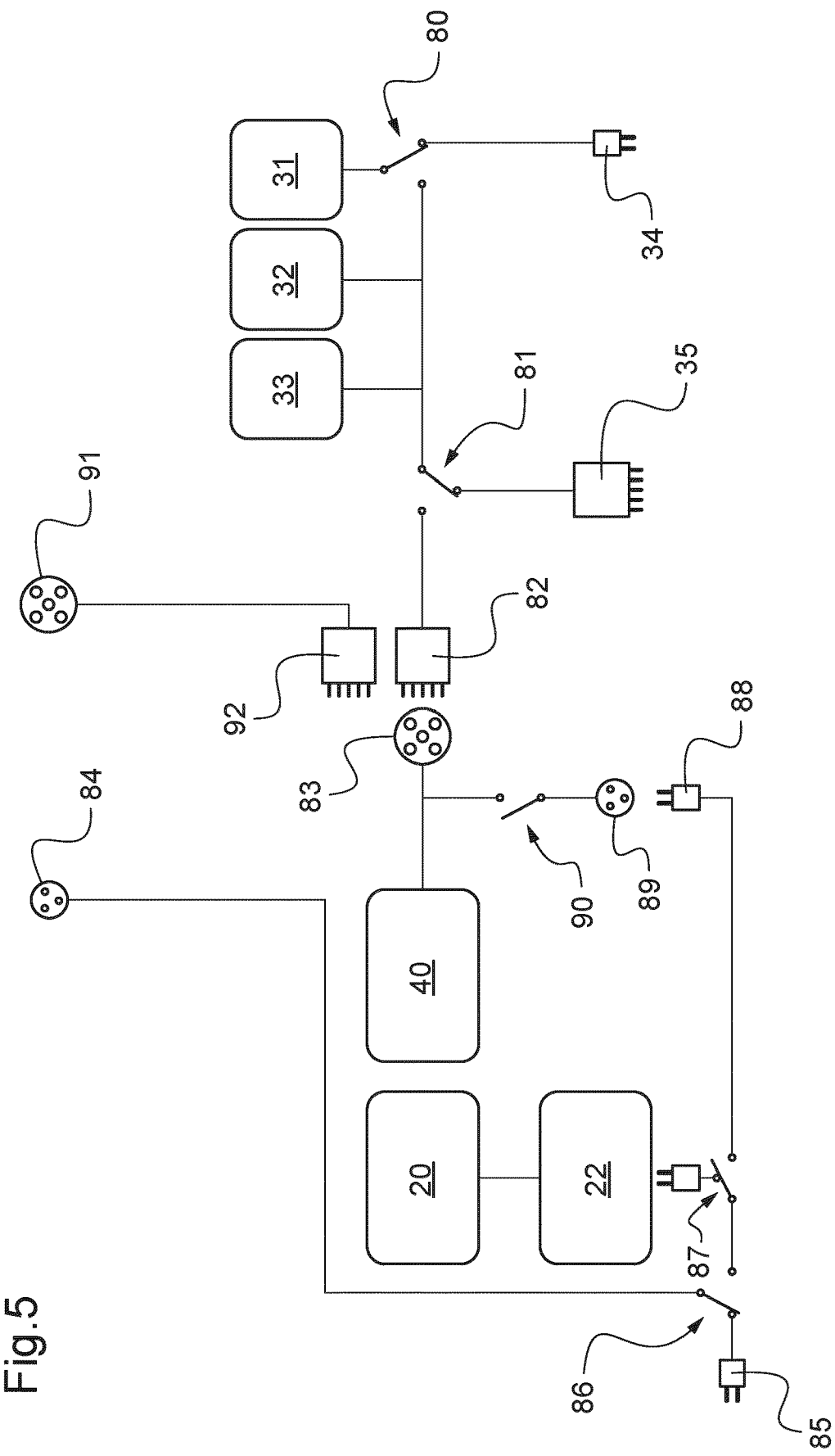
FIG. 5 is a synoptic diagram showing power supply options made available on the aerial work platform.

FIG. 5 shows power supply options available on the aerial work platform.

For charging from the mains, a selector switch 80 allows the first charger 31 to be connected at choice either to the single-phase cable with plug 34 or the like—already mentioned in connection with FIG. 4—for connection to a single-phase mains supply, or to a three-phase power line for connection to one phase and the neutral of a three-phase power source, the cable connecting the other two chargers 32, 33 to a respective phase and the neutral of the three-phase power source.

A selector switch 81 is used to select at choice a three-phase power source from the cable with plug 35 or the like—already mentioned in connection with FIG. 4—for connection to a three-phase mains supply, or to the three-phase output of the power generator 40 via a plug 82 and a corresponding socket 83.

Provision may be made for a standard single-phase electrical outlet 84 on the working platform 3 to be supplied with the single-phase mains voltage of the relevant country, thereby advantageously enabling users of the working platform 3 to connect an electrical appliance to it.

The socket 84 is supplied via an electrical line running down to the frame 1, for example along the lifting system 2.

Provision may be made that such power line may be supplied in one or more of the following ways:

by connection to the single-phase mains supply, e.g., via a dedicated plug 85 or other suitable means,
 by connecting to the output of a dedicated inverter 22 whose input is connected to the battery 20, and/or
 by connection to the output of the power generator 40, in particular between one phase and its neutral if it is a three-phase power generator as in our example.

In the implementation details, provision is made that selector switches can, if necessary, enable the power line to be selectively connected as desired. Where provision is made for all three possibilities, a selector switch 86 may be provided for connection either to the plug 85 or the like or to a power supply from the aerial work platform, a further selector switch 87 allowing selection of connection either to the inverter 22 or to the power generator 40.

Connection to the power generator 40 may, for example, be via a standard single-phase plug 88 connecting to a corresponding single-phase socket 89 connected to a phase and neutral of the power generator 40, preferably via a switch 90. The socket 89 is preferably arranged on the frame 1 and can be used as an auxiliary socket which users can also use to connect any electrical appliance.

Provision may also be made for a standard three-phase electrical outlet 91 on the working platform 3 to be supplied with the three-phase mains voltage of the relevant country, thereby advantageously enabling users of the working platform 3 to connect an electrical appliance to it. The socket 91 is supplied via an electrical line running down to the frame 1, for example along the lifting system 2. It is equipped with a standard three-phase plug 92 provided to be connected at choice either to a mains socket or to an output socket of the power generator 40. The selector switches 80, 81, 86, 87 and 90 and the inverter 22 can be controlled by the on-board electronics 70—mentioned with reference to FIG. 4—in particular according to the commands of an operator. Provision may be made for a control button or similar on the control panel on board the working platform 3 for energizing the socket 84 and/or socket 91 as the case may be. Similarly, provision may be made to allow the operator to select the power source for the socket 84, for example at the console 75 on the frame 1.

Figure 6:
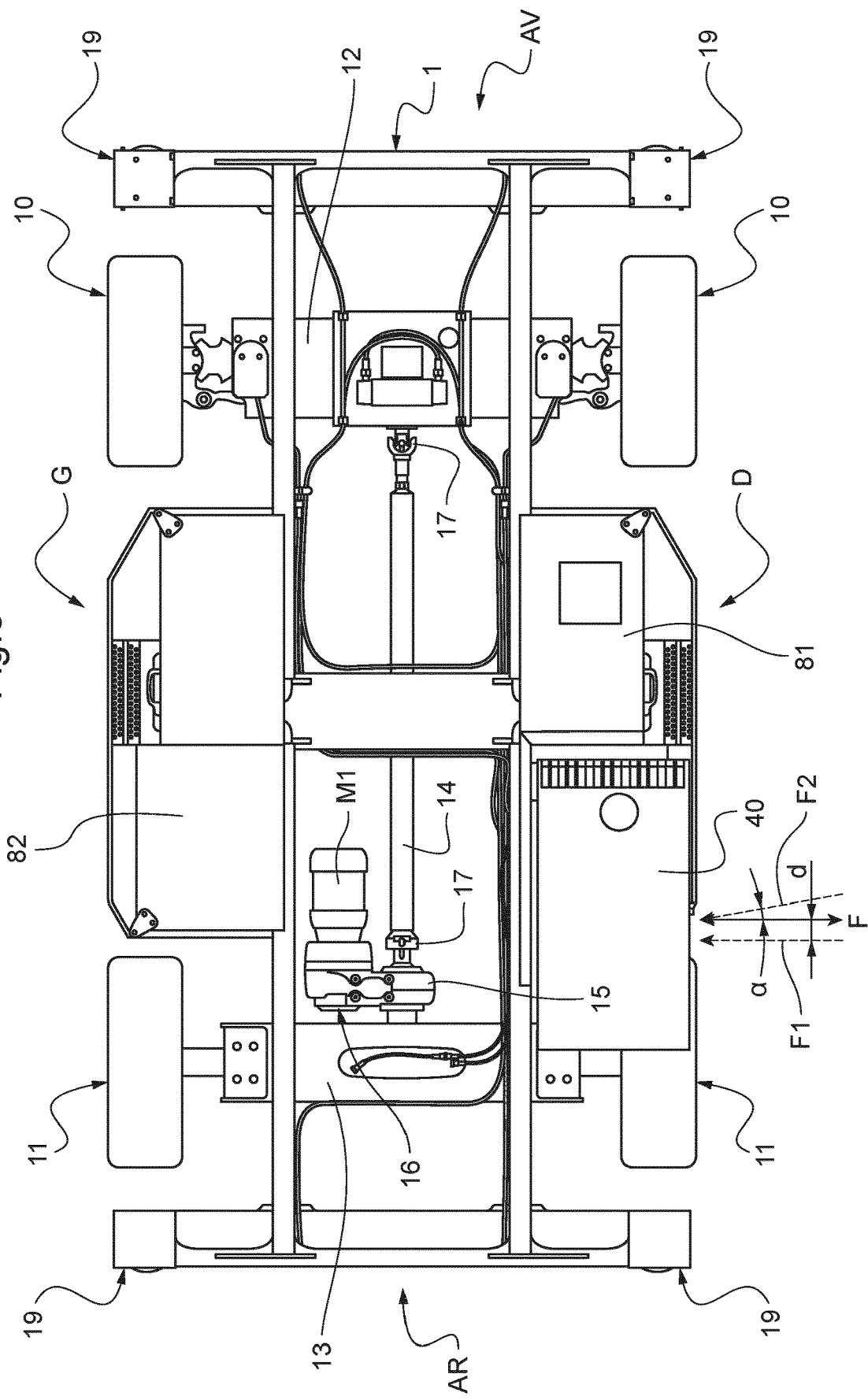
FIG. 6 is a top view of the frame of the aerial work platform, equipped with the side covers housing some of the electrical and hydraulic components of the aerial work platform.
Figure 7:
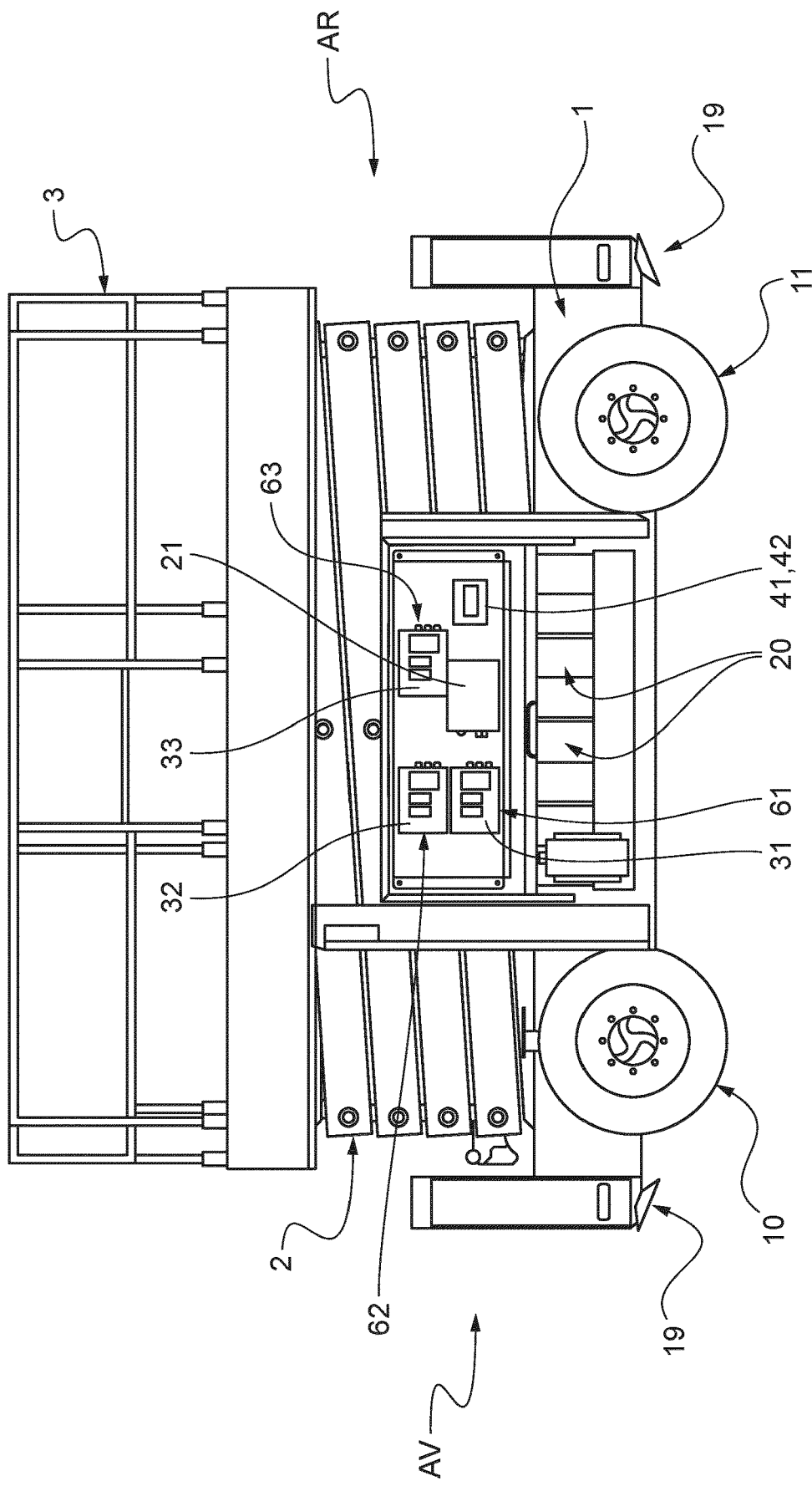
FIG. 7 is a view of the left side of the aerial work platform with the side cover removed.
Figure 8:
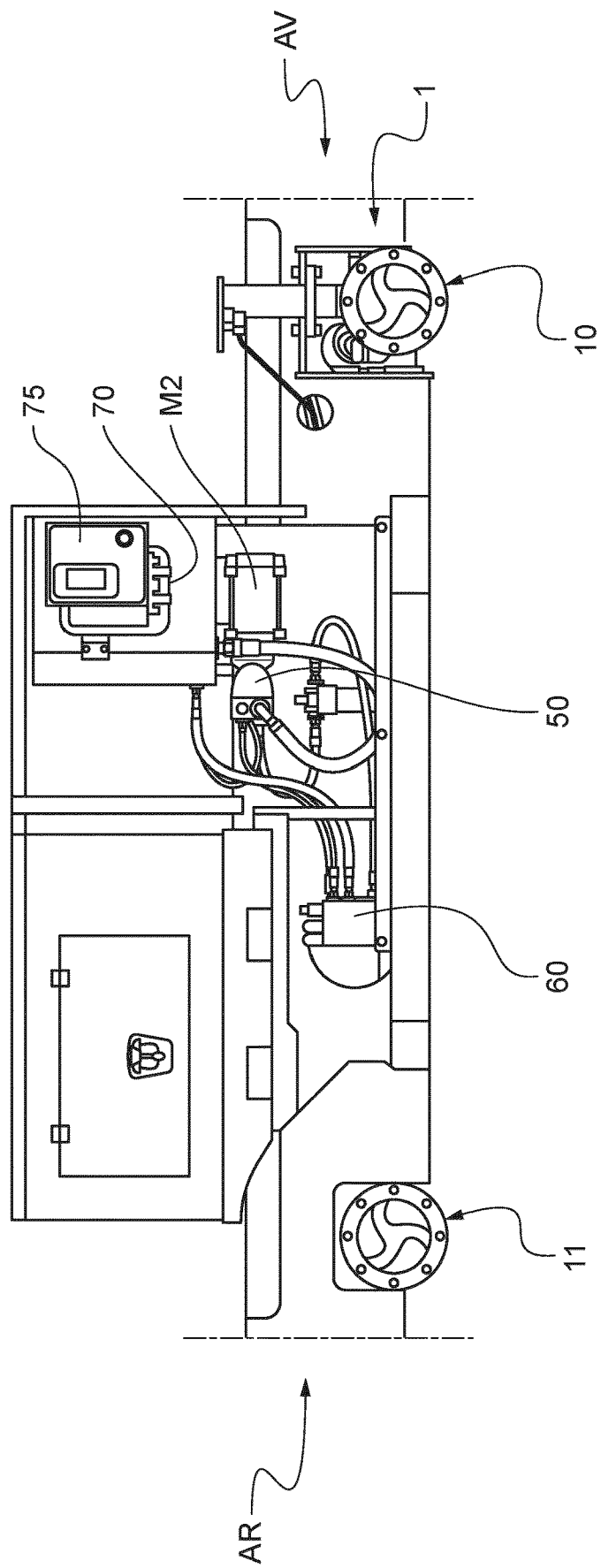
FIG. 8 is a view of the right side of the aerial work platform with the side cover removed.

FIGS. 6 to 8 illustrate the physical layout of the main electrical and hydraulic components on the aerial work platform.

Figure 2:
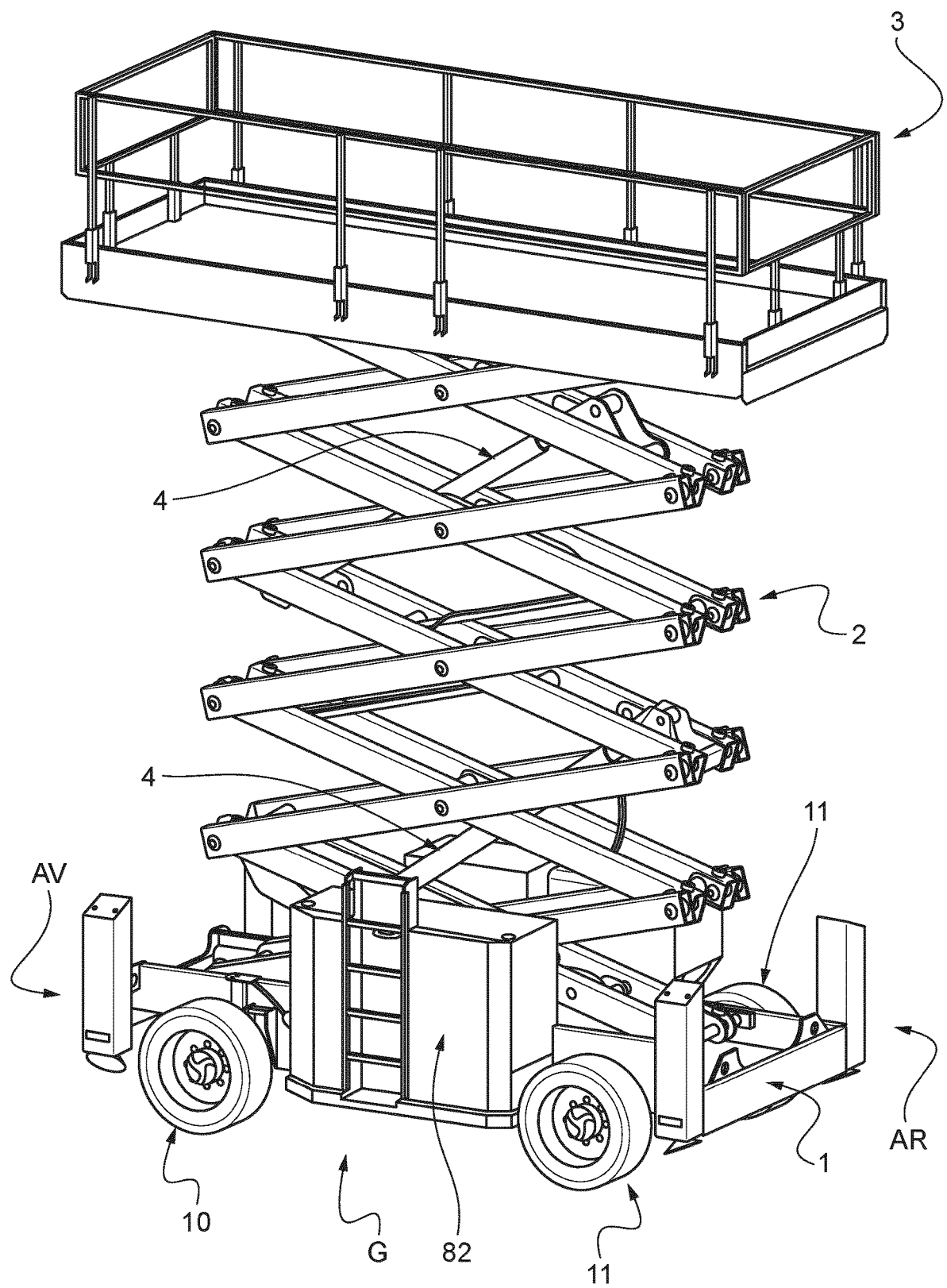
FIG. 2 shows a perspective view of this aerial work platform but seen from its left side and with the work platform in the raised position.

As illustrated in FIG. 7, the battery 20 and the chargers 31, 32 and 33 are located on a first lateral side of the frame 1 with respect to the lifting mechanism 2, i.e., on the left side G in our example. The chargers 31, 32 and 33 are each received in a respective location 61, 62 and 63 provided for this purpose. The locations 62 and/or 63 remain without their charger 32 and/or 33 in the event that the aerial work platform has only one or two chargers. The battery 20 management circuit 21 as well as the inverters 41, 42 can also be arranged on this side of the frame 1. These components are housed within a cover 82 visible in FIGS. 2 and 6.

As illustrated in FIG. 8 (in which the wheel tires 10, 11 and the stabilizer feet 19 have been omitted for convenience), the electric motor M2 and the hydraulic pump 50 are arranged on the opposite lateral side of the frame 1 with respect to the lifting mechanism 2, i.e., on the right side D in our example. The hydraulic distributor 60 is preferably arranged on this same side. A control panel 75 is also provided, behind which the control electronics 70 is arranged. The control panel 75 can also be seen in FIG. 1. These components are housed within a cover 81 visible in FIGS. 1, 3 and 6. Of course, another fixed or removable control panel may be provided on board the working platform 3.

Figure 3:
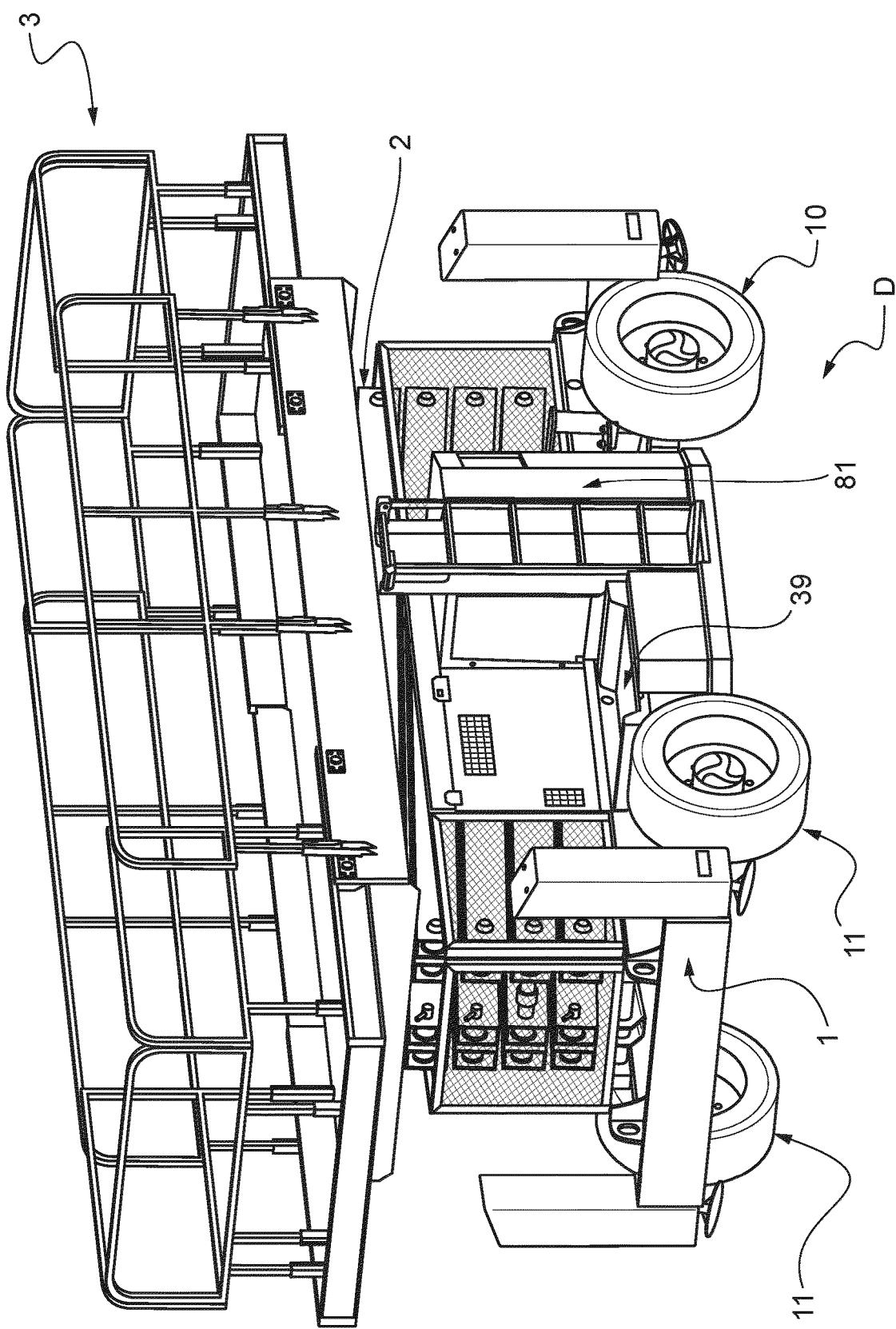
FIG. 3 is a similar view to FIG. 1, but with the power generator removed from the aerial work platform.

As these components are less bulky than the battery 20, a location 39 is provided on this side of the frame for the removable mounting of the power generator 40: see FIG. 3 where location 39 is shown without the power generator 40. Due to its weight, the power generator 40 is preferably placed in or removed from its location 39 by means of a forklift. A device for holding the power generator 40 in position in its location 39—not shown—is preferably provided: this may be of any suitable type. It is advantageous that provision be made for a locking device for the power generator 40 in its location 39 for protection against theft.

An example of the dimensioning of the components is as follows in the case of an aerial work platform intended for lifting a maximum load of 750 kg to a maximum height of 18 m:
  the battery 20 has a nominal voltage of 48 VDC and a capacity of 420 A·h,
  the motor M1 is of the three-phase AC type with a nominal voltage of 32 VAC, 50 Hz, and a maximum output power of 6.3 kW,
  the M2 motor is a three-phase AC motor with a nominal voltage of 32 VAC, 50 Hz, and a maximum output power of 10.5 kW,
  chargers 31 to 33 each accept an AC voltage of between 110 and 230 VAC as input and each provide a voltage of 48 VDC as output and a maximum power of 3 KW,
  depending on the version, the power generator is chosen to supply a single-phase AC voltage between 110 VAC and 230 VAC or a three-phase voltage of 400 VAC, and to supply a maximum power chosen in a range from 6 KW to 9 KW, the capacity of its fuel tank being chosen between 10 and 30 liters.

With particular reference to FIGS. 9 to 15, we will now describe in more detail an advantageous embodiment of the location 39 of the aerial working platform provided to receive the power generator 40 by removable mounting, as well as the latter.

Figure 9:
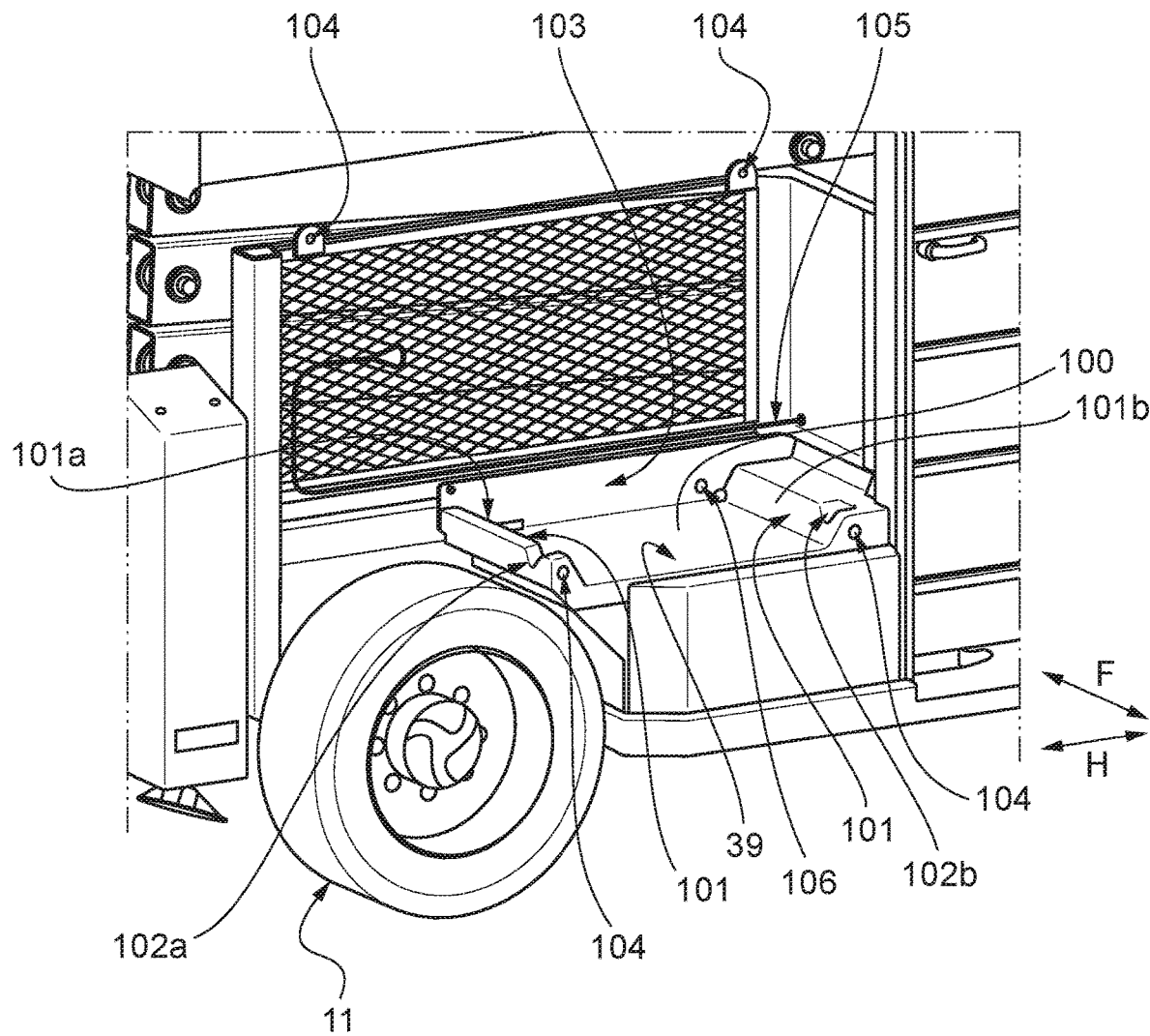
FIG. 9 is a local perspective view of an embodiment of the receiving location of the aerial work platform for the removable mounting of a generator.
Figure 10:
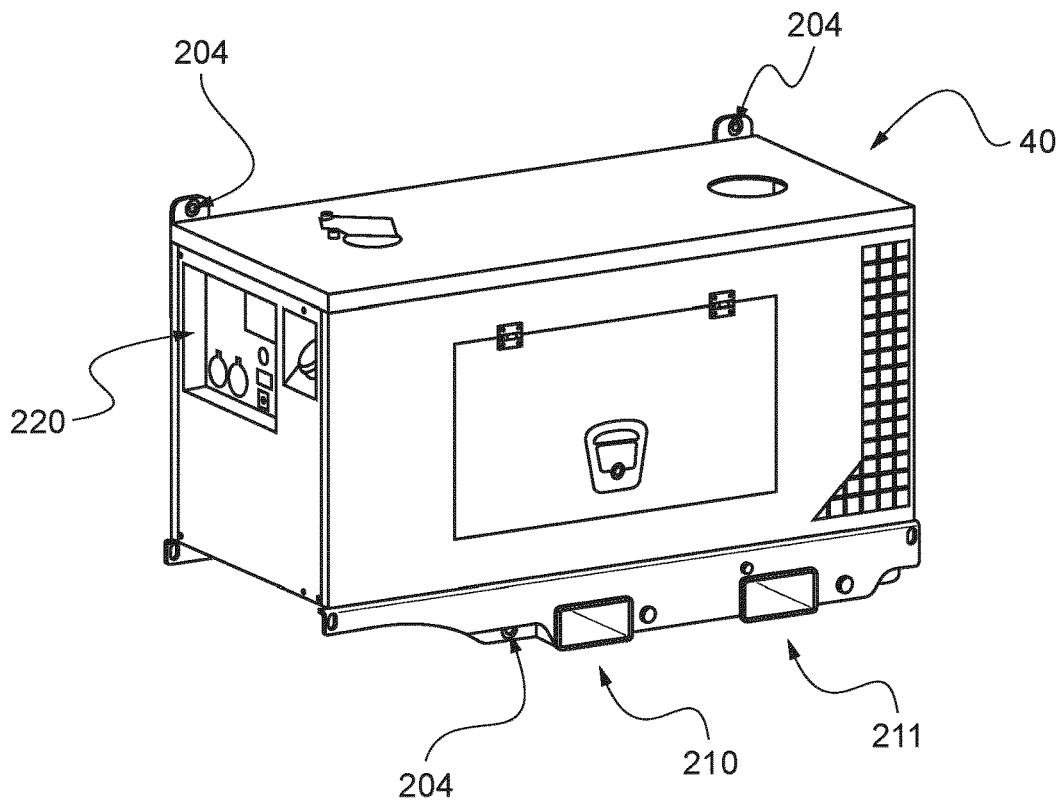
FIG. 10 is a perspective view of a generator viewed from the front and which is intended for removable mounting in the receiving location of the aerial work platform which is illustrated in FIG. 9.
Figure 11:
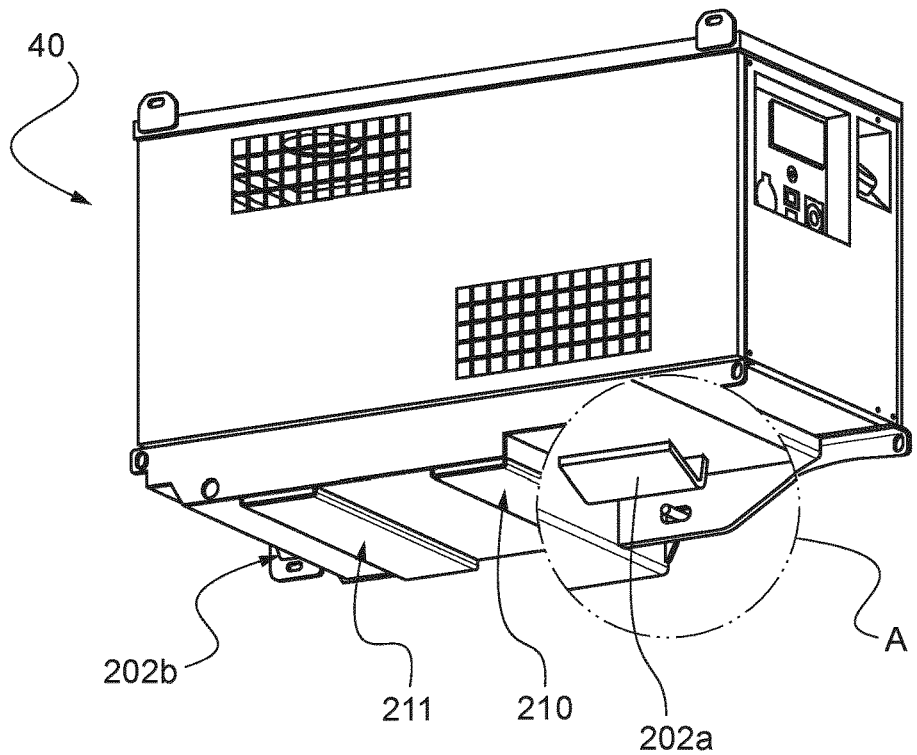
FIG. 11 is a perspective view of the power generator of FIG. 9 but seen from the rear.

Location 39 is located on a lateral side of the frame 1 as shown in FIG. 3. As can be seen in FIGS. 3 and 9, the location 39 is open on the outer side of the aerial work platform. This makes it possible to bring the power generator 40 into the receiving location and to remove it therefrom along a bring-in/removal direction F illustrated in FIG. 9, in particular by means of a forklift. The direction F is preferably substantially horizontal and perpendicular to the side of the frame 1 where the receiving location 39 is provided. In other words, the power generator 40 is placed in the location 39 globally by a horizontal movement towards the location 39, followed by a final lowering movement into the location 39. Alternatively, provision may be made for a door closing the location 39, the door then being opened during the operations of installing or removing the power generator 40 from the location 39.

The location 39 comprises a support 100 on which the power generator 40 rests. In this example, the support 100 is a continuously extending surface under the power generator 40, but it may be made in any suitable form such as two individual support bars that are parallel and spaced apart from each other. In this example, the location 39 is arranged on the frame 1 in a position adjacent to the wheel 11 of the frame 1 such that a portion of the power generator 40 extends out of the frame 1 above the wheel 11 when the power generator 40 is in the location 39. This measure makes it possible to limit the size reserved for the location 39 on the frame 1, especially since the frame 1 does not generally extend below the wheels 10, 11 of the aerial work platform.

The support 100 includes a positioning structure 101 for the power generator 40 in the location 39. In this example, the positioning structure 101 comprises two inclined planes 101a, 101b in opposite directions and offset from each other in the horizontal direction H perpendicular to the direction of bring-in/removal F. The direction H in this case corresponds to the longitudinal AV-AR direction of the frame 1. Each of the inclined planes 101a, 101b is a flat surface parallel to the bring-in/removal direction F.

Figure 12:
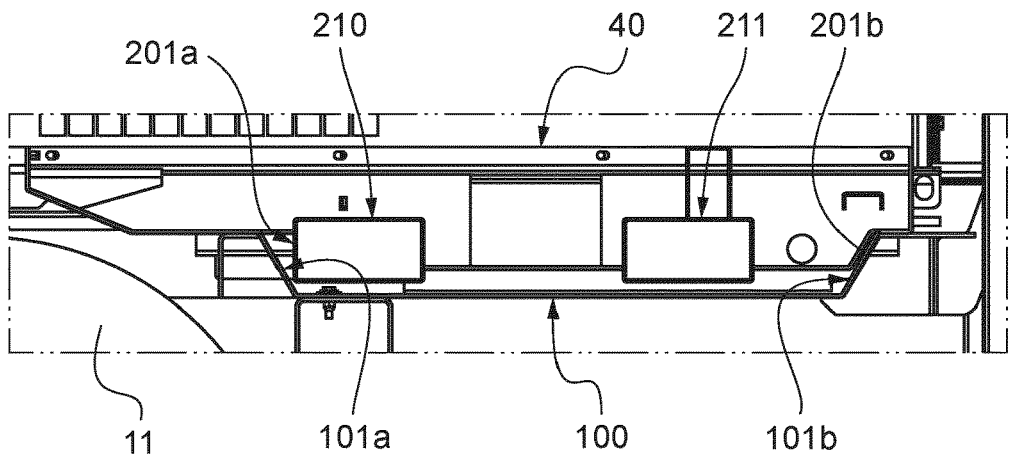
FIG. 12 is a local schematic front view illustrating the cooperation between the lower part of the generator of FIGS. 10 and 11 and the bottom of the dedicated location of the aerial work platform shown in FIG. 9 when the generator is placed in the location.
Figure 13:
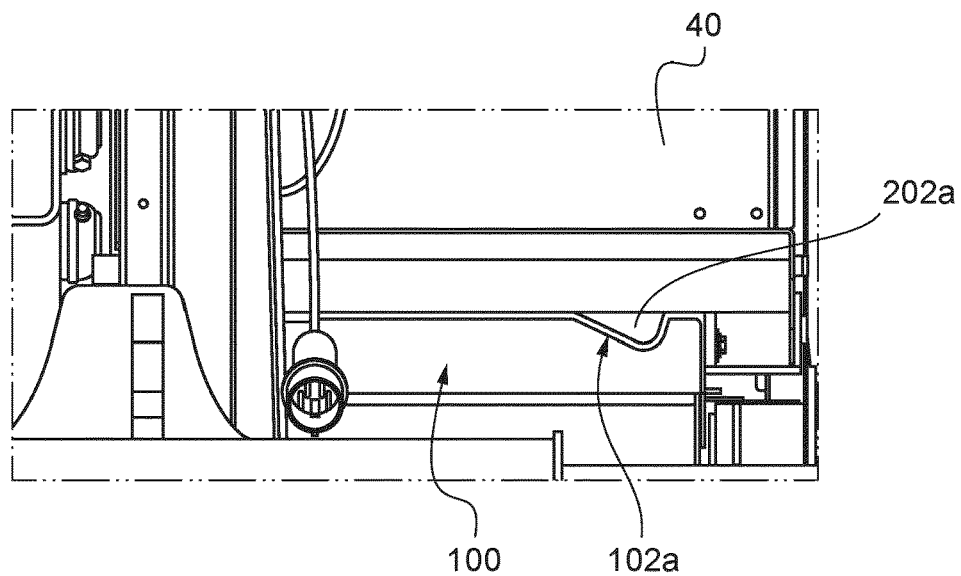
FIG. 13 is a local schematic side view corresponding to FIG. 12.
Figure 14:
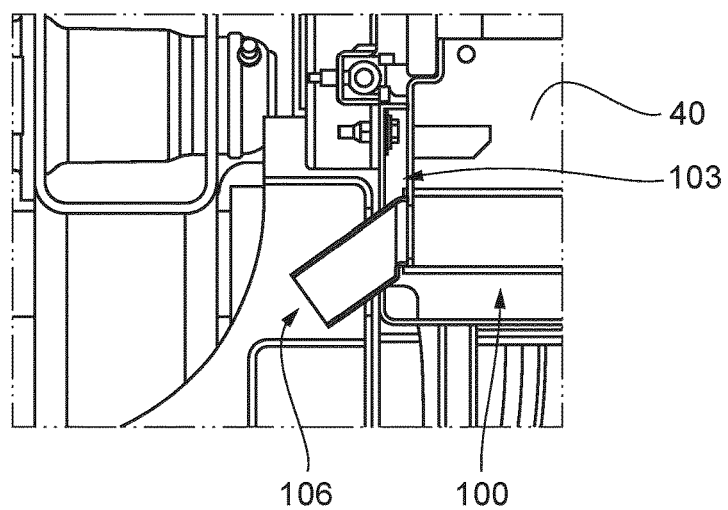
FIG. 14 is a local schematic section at the lower rear portion of the location dedicated to the power generator which illustrates an exhaust gas conduit tube provided at this place in the embodiment of FIGS. 9 to 13.
Figure 15:
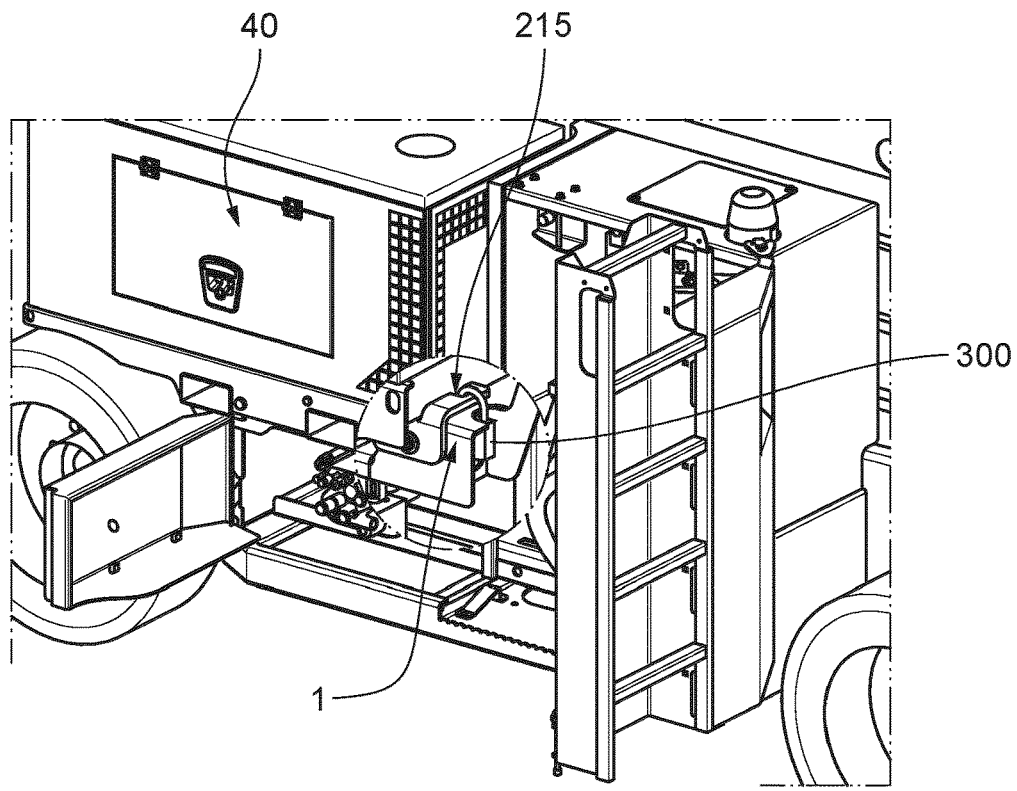
FIG. 15 is a local view illustrating a way to lock the power generator in the dedicated location of the aerial work platform for this same embodiment.
Figure 16:
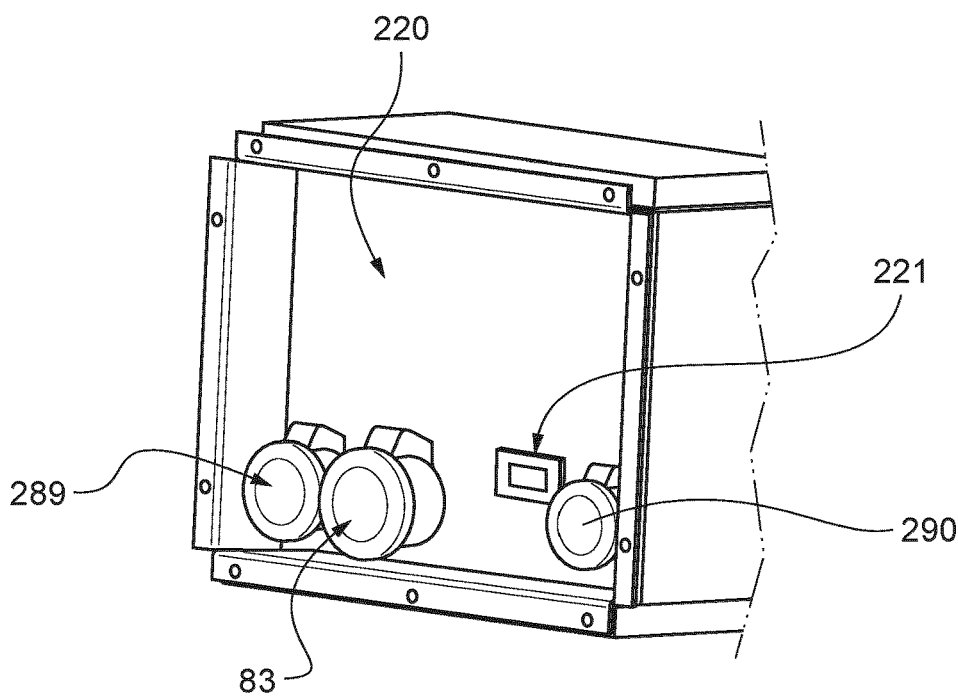
FIG. 16 is a local side view of the power generator of FIGS. 10 and 11 which illustrates its electrical panel.

The inclined planes 101a, 101b are intended to cooperate with a complementary structure arranged on the underside of the power generator 40. This complementary structure is illustrated in FIG. 12. In this case, it comprises, on the one hand, a side 201a of a tube 210 constituting a passage for a prong of a fork of a forklift. This side 201a of the tube 210 cooperates with the inclined section 101a of the support 100. The complementary structure of the power generator 40 comprises, on the other hand, an inclined flank 201b provided to cooperate with the inclined plane 101b of the support 100.

The cooperation in shape between the positioning structure 101 of the location 39 and the complementary structure 201a, 201b of the power generator 40 allows, when the power generator 40 is brought into the location 39, to correct a possible lack of centering of the power generator 40 with respect to the receiving location in the direction G. This is illustrated in the top view of the frame 1 in FIG. 6, where the arrow F1 illustrates an actual bring-in direction of the power generator 40 laterally offset by a distance d from the bring-in direction F ideally centered with respect to the receiving location 39.

Similarly, the cooperation in shape between the positioning structure 101 of the receiving location 39 and the complementary structure 201a, 201b of the power generator 40 allows, when the power generator 40 is brought into the location 39, to correct a possible angular misalignment of the power generator in a horizontal plane with respect to the direction of bring-in/removal F. This situation is also illustrated in the top view of the frame 1 in FIG. 6, where the arrow F2 illustrates the actual bring-in direction of the power generator 40 with an angular offset a in a horizontal plane with respect to the bring-in direction F ideally oriented with respect to the location 39.

It will be understood that the shape cooperation between the positioning structure 101 of the location 39 and the complementary structure 201a, 201b of the power generator 40 allows a combined lack of centering and angular misalignment of the power generator 40 to be corrected in the same manner.

This automatic correction of the centering and angular orientation of the power generator 40 with respect to the location 39 advantageously allows correct positioning of the power generator 40 in the location 39, despite an imprecise approach maneuver of the power generator 40 towards the location 39 when placing it in the latter. This facilitates the placement of the power generator 40 in the location 39, whether a forklift is used or otherwise. For its handling by a forklift, the power generator 40 preferably comprises two tubes 210, 211 for the passage of the fork of the forklift, which are preferably arranged on the underside of the power generator 40: see FIG. 10. The fork passage tubes 210, 211—or alternatively another structure intended for the passage of a fork—are made non-through at the rear of the power generator 40, which eliminates the risk of interference of the fork of a forklift with the wall 103 or any other structure of the aerial work platform at the rear of the location 39.

It will be understood that the positioning structure 101 of the location 39 and the complementary structure 201a, 201b may be made in any other suitable manner. For example, the inclined planes 101a, 101b may be oriented in opposite directions instead of facing each other. Alternatively, there could be only one inclined plane in the location 39, the other being replaced by a shoulder similar to the case of the side 201a of tube 210 of the power generator 40. Other shapes than inclined planes are also possible. The positioning structure of the receiving location 39 may also be arranged elsewhere than on the support surface 100, for example on lateral sides of the location 39.

The location 39 also includes two notches 102a and 102b provided at the inclined planes 101a and 101b. The power generator 40 has two projections 202a and 202b on the underside which engage the notches 102a and 102b of the location 39 respectively when the power generator 40 is in place in the receiving location 39: see the local side view in FIG. 13. Projection 202a is particularly visible on the local enlargement referenced A in the bottom view of the power generator of FIG. 11.

The cooperation of the projections 202a and 202b and the notches 102a and 102b in which they are engaged opposes the withdrawal of the power generator 40 from the location 39 in the bring-in/removal direction. In particular, this allows the fork of a forklift to be moved out from under the power generator 40 without the risk of accidental removal of the power generator 40 from the receiving location 39, after an operation of placing the power generator 40 in the location 39 by means of the forklift.

It will be understood that the retaining structure formed by the notches 102a, 102b and the complementary retaining structure formed by the projections 202a and 202b is only one example of implementation and may be implemented in any other suitable manner. For example, the notches 102an, 102b may be located elsewhere than at the inclined planes 101a and 101b. There could be only one notch and one projection. Structures other than notches and corresponding projections can also be considered.

In general, it is noted that the positioning structure 101 and the complementary structure 201a, 201b, and similarly the retaining structure 102a, 102b and the complementary structure 202a, 202b, can advantageously be fixed structures—i.e., without any moving parts—of the location 39 and the power generator 40 respectively, which provides both robustness and simplicity of implementation.

The location 39 also includes a rear wall 103 that serves as a stop for positioning the power generator 40 in the receiving location in the bring-in/removal direction. In particular, this prevents the power generator 40 from being pushed beyond the location 39 during a placement operation of the power generator 40. This stop function can be achieved by any other appropriate means, such as one or more pins projecting from the support 39.

The location 39 also includes removable fastening means for holding the power generator 40 securely in the location 39 and releasing it so as to allow removal of the power generator 40 from the location 39. In a simple embodiment, these means of fastening may be threaded holes 104 for receiving fastening screws passing through-holes in legs 204 of the power generator 40. Thus, after the power generator 40 has been placed in the location 39, the removable fastening means prevent the power generator 40 from leaving the location 39, whereas the retaining structure formed by the notches 102a, 102b and the complementary retaining structure formed by the projections 202a and 202b leaves this risk remaining, in particular in the event of circulation of the aerial work platform on uneven ground. It will be understood that the removable fastening means may be implemented by any suitable means other than threaded holes for fastening screws.

The location 39 may also include an exhaust gas conduit tube 106 that is positioned adjacent to or contiguous with an exhaust outlet of the power generator 40 when placed in the location 39. The tube 106 is in this example provided at the rear wall 103. The tube 106 is best seen in the local view of FIG. 14. This allows the exhaust gases to be discharged to a location away from the users, preferably under the frame 1.

As already mentioned, a locking device may be provided for the power generator 40 in its receiving location 39 for protection against theft. In particular, the location 39 may be provided with a structure or means for an anti-theft locking or padlocking of the power generator 40 in the location 39 possibly in cooperation with an associated structure or means of the power generator 40. A simple implementation consists of a through-hole made on the frame 1 in correspondence with a through-hole 215 at the level of the housing of the power generator 40 so as to allow the fixing of an anti-theft padlock 300: see FIG. 15. Alternatively, it may be a removable bar capable of being held in front of receiving location 39 so as to pass in front of the power generator 40 in location 36, the bar being lockable with the location 39. According to another embodiment, it may be a door closing the location 39 and lockable by a key lock or a code lock or the like.

The aerial work platform may comprise one or more cable feed guides, for example for feeding a data link cable and/or a power connection cable to the location 39. Such a cable feeder has been shown in FIG. 9 only for a power connection cable: see reference 105. The power connection cable 105 is provided to connect the power generator 40 to the electrical power circuit of the aerial work platform, for example to power the chargers of the aerial work platform. An electrical panel 220 of the power generator 40 is provided for this purpose with the power socket 83 already mentioned with reference to FIG. 5. In another embodiment, the power generator 40 may be provided to directly power the electric motors and other electrical circuits of the aerial work platform.

The data link cable, if provided, is used to connect the on-board electronics 70 of the aerial work platform 1 to the power generator 40 when in the location 39. In this case, the electrical panel 220 may have a connector 221 for connecting the corresponding connector of the data link cable of the aerial work platform.

The functionality of the on-board electronics 70 of the aerial work platform 1 with respect to the power generator 40 has already been discussed above with reference to FIG. 5. In general, it is advantageous that the on-board electronics 70 can control the power generator 40. Even more advantageously, the power generator 40 may be arranged to be controlled exclusively by the on-board electronics 70. In other words, the power generator 40 then operates solely as a slave to the on-board electronics 70. The power generator 40 is then devoid of manual or similar control devices for controlling the power generator 40 independently of the on-board electronics 70, except possibly for an emergency stop button and protective devices such as automatic fuses. However, the power generator 40 may also be without an emergency stop button, whereby this function with respect to the power generator 40 may also be managed by the on-board electronics 70 of the aerial work platform.

The electrical panel 220 of the power generator can also be equipped with other outlets. In particular, it may be equipped with a single-phase outlet 289 powered by the power generator 40. The socket 289 can be used in particular to connect to a corresponding plug of a cable—not shown—fed to the location 39 by the cable(s) feeder 105. This can be the cable with the plug 88—see FIG. 5—for plugging into socket 289. It can also be the cable with the plug 89 at the other end: see also FIG. 5.

The electrical panel 220 can also be equipped with a socket 290 for connection to the mains. In this case, the power generator 40 preferably includes a selector switch allowing to selectively supply the power outlet 83, either by the power generator 40 itself, or from the outlet 290 when it is connected to the mains. This selector switch is preferably controlled by the on-board electronics 70.

The on-board electronics 70 may also include a wireless communication module and thereby enable remote control of the power generator 40. In particular, the on-board electronics 70 may be configured to allow remote starting and/or remote inhibition of the power generator 40 via the wireless communication module.

Naturally, the present invention is not limited to the examples and the embodiment described and represented, but numerous variants accessible to the person skilled in the art are possible. Thus, it can be applied to aerial work platforms with a different type of working platform lifting mechanism. This may be, for example, an articulated telescopic arm supporting the working platform 3 at its upper end. In this case, it may also include a turret mounted on the frame 1 to pivot about a vertical axis which supports the telescopic arm. In the latter case, the electrical and hydraulic components can advantageously be arranged on the turret, with the exception of the motor(s) M1 for driving the front and/or rear wheels 10, 11. In this case, the location 39 for the removable mounting of the power generator 40 is preferably arranged on the turret.

The invention claimed is:

1. An electric aerial work platform suitable for all-terrain outdoor use, comprising:
    a frame equipped with at least two front wheels and at least two rear wheels allowing the translation of the aerial work platform along the ground;
    a working platform;
    a lifting mechanism which supports the working platform, the lifting mechanism being mounted on the frame;
    at least one first electric motor adapted to provide driving power used to move the aerial work platform along the ground;
    at least one second electric motor adapted to provide driving power used to operate the lifting mechanism of the working platform,
    at least one rechargeable electric battery arranged to power the at least one first and the at least one second electric motor,
    wherein:
    driving power for moving the aerial work platform along the ground is always provided exclusively by the at least one first electric motor, and
    driving power for actuating the lifting mechanism of the work platform is always provided exclusively by the at least one second electric motor; and
    the aerial work platform further comprises:
    a front axle equipped with the two front wheels and a rear axle equipped with the two rear wheels, at least one of the axles being a transmission axle which is adapted to transmit the driving force of the at least one first electric motor to the corresponding wheels,
    at least one single-phase charger adapted to recharge the at least one rechargeable electric battery by connection to a single-phase power supply network; and
    a location arranged to removably mount a power generator, the aerial work platform being adapted to connect the power generator to at least one of the at least one single-phase charger when the power generator is removably mounted in the location, thereby allowing the battery to be recharged by the power generator,
    wherein the electric aerial work platform is designed to function both when the power generator is and is not mounted in the location and connected to the at least one of the at least one single-phase charger.

2. The aerial work platform according to claim 1, comprising three locations each arranged to receive a respective single-phase charger, each of the at least one single-phase charger being received in a respective one of the three locations, the aerial work platform being able to connect each single-phase charger received in one of the three locations to a respective phase and to a neutral of a three-phase power supply network so as to be able to charge the at least one rechargeable electrical battery from the current of two or three phases of the three-phase mains power supply network.

3. The aerial work platform of claim 2, wherein a respective single-phase charger is received in two of the three locations or in all three of the three locations.

4. The aerial work platform according to claim 1, comprising three single-phase chargers dimensioned so as to be able to charge the at least one rechargeable electric battery to 80% of its capacity in less than 3 hours when connected to a suitable three-phase power supply network.

5. The aerial work platform according to claim 1, further comprising a hydraulic circuit adapted to operate the lifting mechanism and comprising at least one hydraulic pump, wherein the at least one second electric motor serves to drive the at least one hydraulic pump.

6. The aerial work platform according to claim 5 wherein:
    the at least one rechargeable electric battery and the at least one single-phase charger are located on a first lateral side of the frame with respect to the lifting mechanism, and
    the at least one second electric motor, the at least one hydraulic pump and the location arranged to removably mount the power generator are located on a second lateral side with respect to the lifting mechanism, the second lateral side being on the other side of the frame with respect to the first lateral side.

7. The aerial work platform according to claim 1, wherein the front axle and the rear axle each constitute a transmission axle for transmitting the driving force of the at least one first electric motor to the corresponding wheels.

8. The aerial work platform according to claim 7, comprising a single first electric motor and a single second electric motor.

9. The aerial work platform according to claim 1, comprising a single first electric motor or a single second electric motor.

10. The aerial work platform according to claim 1, wherein the at least one first electric motor and the at least one second electric motor are AC motors operating at a nominal voltage less than or equal to 70 VAC, the aerial work platform comprising at least one inverter for supplying the at least one first and the at least one second electric motor from the at least one rechargeable electric battery, the rated voltage of the at least one rechargeable electric battery being less than or equal to 100 VDC.

11. The aerial work platform according to claim 1, comprising a power generator capable of being removably mounted in the location, the aerial work platform being adapted to connect the power generator to at least one of the at least one single-phase charger when the power generator is removably mounted in the location, thereby allowing the battery to be recharged by the power generator.

12. The aerial work platform according to claim 11, wherein the power generator has a fuel tank, a volume of which makes it possible to charge the at least one rechargeable electric battery to at least 50% of its capacity.

13. The aerial work platform according to claim 1, comprising on-board electronics arranged to interact with the power generator when the power generator is removably mounted in the location, the onboards electronics being capable of at least one of the following:
   identifying the type of power generator and to adapting a charging curve of the at least one rechargeable electric battery as a function of the identified type of power generator; and
   automatically causing the power generator to start when a charge level of the at least one rechargeable electric battery falls below a predetermined threshold.

14. The aerial work platform according to claim 1, comprising on-board electronics being capable of at least one of the following:
   limiting the power peaks absorbed by the at least one first and the at least one second electric motor, and
   limiting the power delivered to the at least one first electric motor and to the at least one second electric motor as a function of at least one parameter of the at least one rechargeable electric battery.

15. The aerial work platform according to 1, further comprising a single-phase electrical outlet installed on the working platform, the aerial work platform being provided to supply the single-phase electrical outlet by one or more of the following possibilities:
   connection to a single-phase power supply network,
   supply by the at least one rechargeable electric battery via an inverter (with which the aerial work platform is equipped, and
   supply by the power generator when the power generator is removably mounted in the location.

16. The aerial work platform according to claim 1, further comprising a three-phase electrical outlet installed on the working platform, the aerial work platform being provided to supply the three-phase electrical outlet by connection to a three-phase electrical supply network or by the power generator.

17. The aerial work platform according to claim 1, wherein the lifting mechanism of the working platform is of the scissor type.

18. The aerial work platform according to claim 1, wherein the at least one single-phase charger is mounted on the aerial work platform independently from whether a power generator is mounted or not in the location arranged to removably mount a power generator.

19. An electric aerial work platform suitable for all-terrain outdoor use, comprising:
   a frame equipped with at least two front wheels and at least two rear wheels allowing the translation of the aerial work platform along the ground,
   a working platform,
   a lifting mechanism which supports the working platform, the lifting mechanism being mounted on the frame,
   at least one first electric motor adapted to provide driving power used to move the aerial work platform along the ground,
   at least one second electric motor adapted to provide driving power used to operate the lifting mechanism of the working platform,
   at least one rechargeable electric battery arranged to power the at least one first and the at least one second electric motor,
   wherein:
   driving power for moving the aerial work platform along the ground is always provided exclusively by the at least one first electric motor, and
   driving power for actuating the lifting mechanism of the work platform is always provided exclusively by the at least one second electric motor,
   the aerial work platform further comprises:
   a front axle equipped with the two front wheels and a rear axle equipped with the two rear wheels, at least one of the axles being a transmission axle which is adapted to transmit the driving force of the at least one first electric motor to the corresponding wheels,
   three single-phase chargers arranged to recharge the at least one rechargeable electric battery by connection to a three-phase power supply network, at least one of the three single-phase chargers being arranged to recharge the at least one rechargeable electric battery by connection to a single-phase power supply network; and
   a location arranged to removably mount a power generator, the aerial work platform being adapted to connect the power generator to at least one of the three single-phase chargers when the power generator is removably mounted in the location, thereby allowing the battery to be recharged by the power generator,
   wherein the three single-phase chargers are mounted on the aerial work platform independently from whether a power generator is mounted or not in the location arranged to removably mount a power generator, and
   wherein the electric aerial work platform is designed to function both when the power generator is and is not mounted in the location and connected to the at least one of the at least one single-phase charger.

20. The aerial work platform according to claim 19, comprising a first cable arranged to connect the three single-phase chargers to a three-phase socket of a three-phase electrical network and a second cable arranged to connect the at least one of the three single-phase chargers to a single-phase socket of a single-phase electrical network.

* * * * *